US008873072B2

(12) United States Patent
Aritomi

(10) Patent No.: US 8,873,072 B2
(45) Date of Patent: Oct. 28, 2014

(54) PRINTING CONTROL METHOD AND PRINTING CONTROL APPARATUS AND COMPUTER PROGRAM USING PROGRAM MODULE FOR VARYING PRINT SETTINGS

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 12/731,986

(22) Filed: Mar. 25, 2010

(65) Prior Publication Data

US 2010/0245911 A1 Sep. 30, 2010

(30) Foreign Application Priority Data

Mar. 30, 2009 (JP) ................................. 2009-082787

(51) Int. Cl.
*G06F 3/12* (2006.01)

(52) U.S. Cl.
USPC .......... 358/1.13; 358/1.9; 358/1.14; 358/518; 358/523

(58) Field of Classification Search
CPC ............. H04N 1/2369; H04N 1/00517; G06F 3/1205; G06F 3/1204; G06F 17/211
USPC ................... 358/1.9–1.16, 518, 523; 719/321
See application file for complete search history.

(56) References Cited

U.S. PATENT DOCUMENTS

| 6,940,614 | B2* | 9/2005 | Subramaniam | 358/1.13 |
| 8,239,883 | B2* | 8/2012 | Saito | 719/321 |
| 2003/0184781 | A1 | 10/2003 | Laughlin | |
| 2004/0223182 | A1* | 11/2004 | Minagawa | 358/1.15 |
| 2006/0221370 | A1 | 10/2006 | Iida | |
| 2006/0221372 | A1* | 10/2006 | Onishi et al. | 358/1.13 |
| 2006/0282772 | A1 | 12/2006 | Chamberlin | |
| 2007/0002349 | A1* | 1/2007 | Hwang et al. | 358/1.13 |
| 2008/0080000 | A1* | 4/2008 | Kadota | 358/1.15 |
| 2008/0304092 | A1* | 12/2008 | Ebuchi | 358/1.13 |
| 2009/0021769 | A1 | 1/2009 | Edmonds | |

FOREIGN PATENT DOCUMENTS

| JP | 2006-085253 A | 3/2006 |
| JP | 2006-209195 A | 8/2006 |
| JP | 2006-309725 A | 11/2006 |
| JP | 2007-004332 A | 1/2007 |
| JP | 2008-165291 A | 7/2008 |
| JP | 2009-025943 A | 2/2009 |

\* cited by examiner

*Primary Examiner* — Dennis Dicker
(74) *Attorney, Agent, or Firm* — Canon USA, Inc. IP Division

(57) ABSTRACT

A method includes determining whether a program module for varying print settings for a printer driver is participating in print processing when the printer driver executes print processing; and switching a part of the print settings for the printer driver to the print settings according to the program module when the program module is participating in the print processing.

18 Claims, 24 Drawing Sheets

801

- SYSTEM PROCESS
  - SESSION MANAGER
    - SYSTEM LOGON PROCESS
      - SYSTEM AUTHENTICATION PROCESS
        - USER MANAGEMENT PROCESS
          - USER PROCESS
            - Explorer
              - TOOL A
                - APPLICATION
                  - PRINTER DRIVER

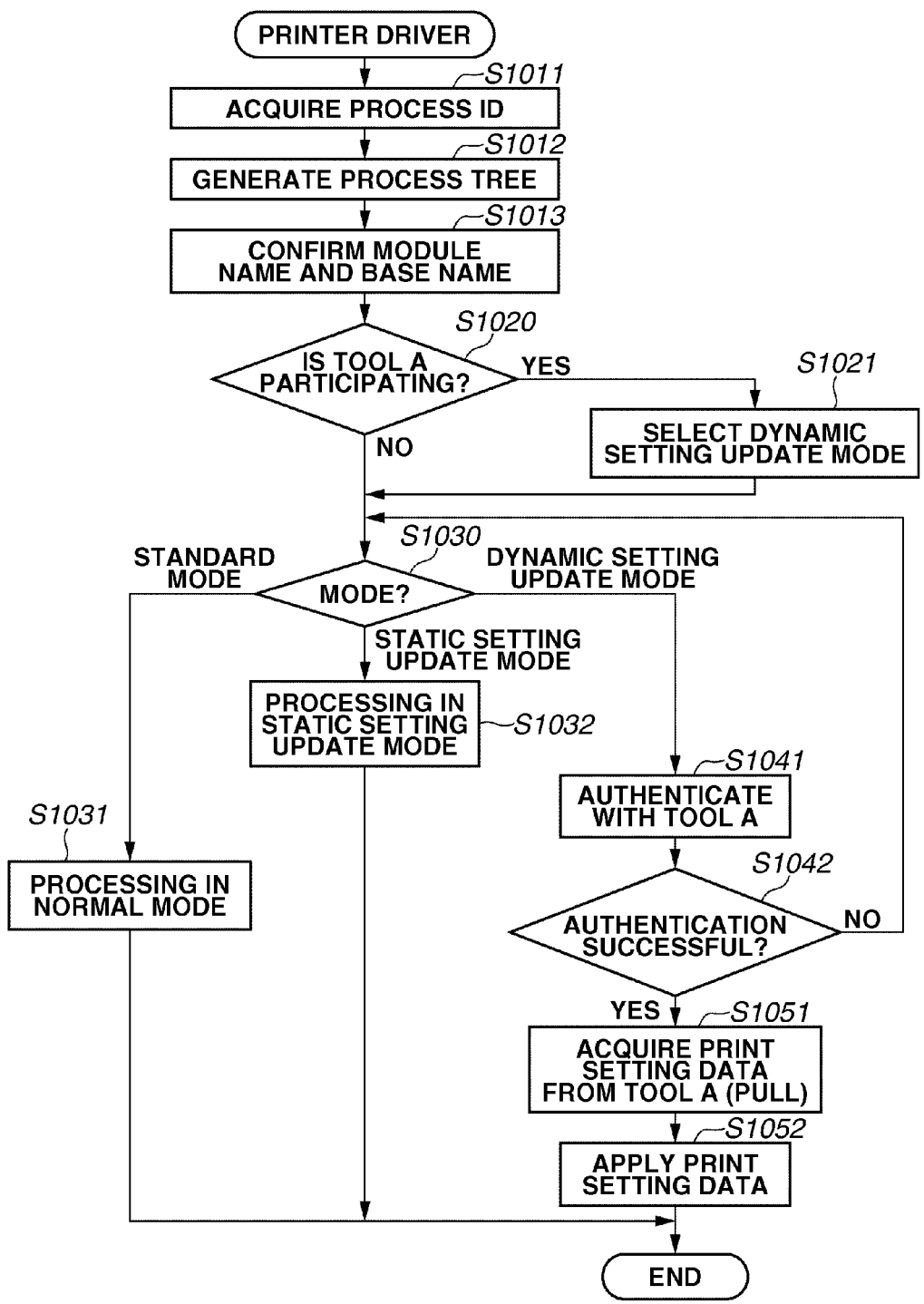

FIG.17A

GENERATE CUSTOMIZED DATA — 1710

SETTINGS — 1720
- DEVICE: [dropdown]
- ☑ DOCUMENT Prop  ☐ PRINTER Prop  ☐ FAVORITES
- [SETTINGS...] — 1725

INFORMATION — 1730
- TITLE: CUSTOM SETTING 05
- CODE:
- CREATOR:
- FILE NAME: [REFER...]

[SAVE] — 1740

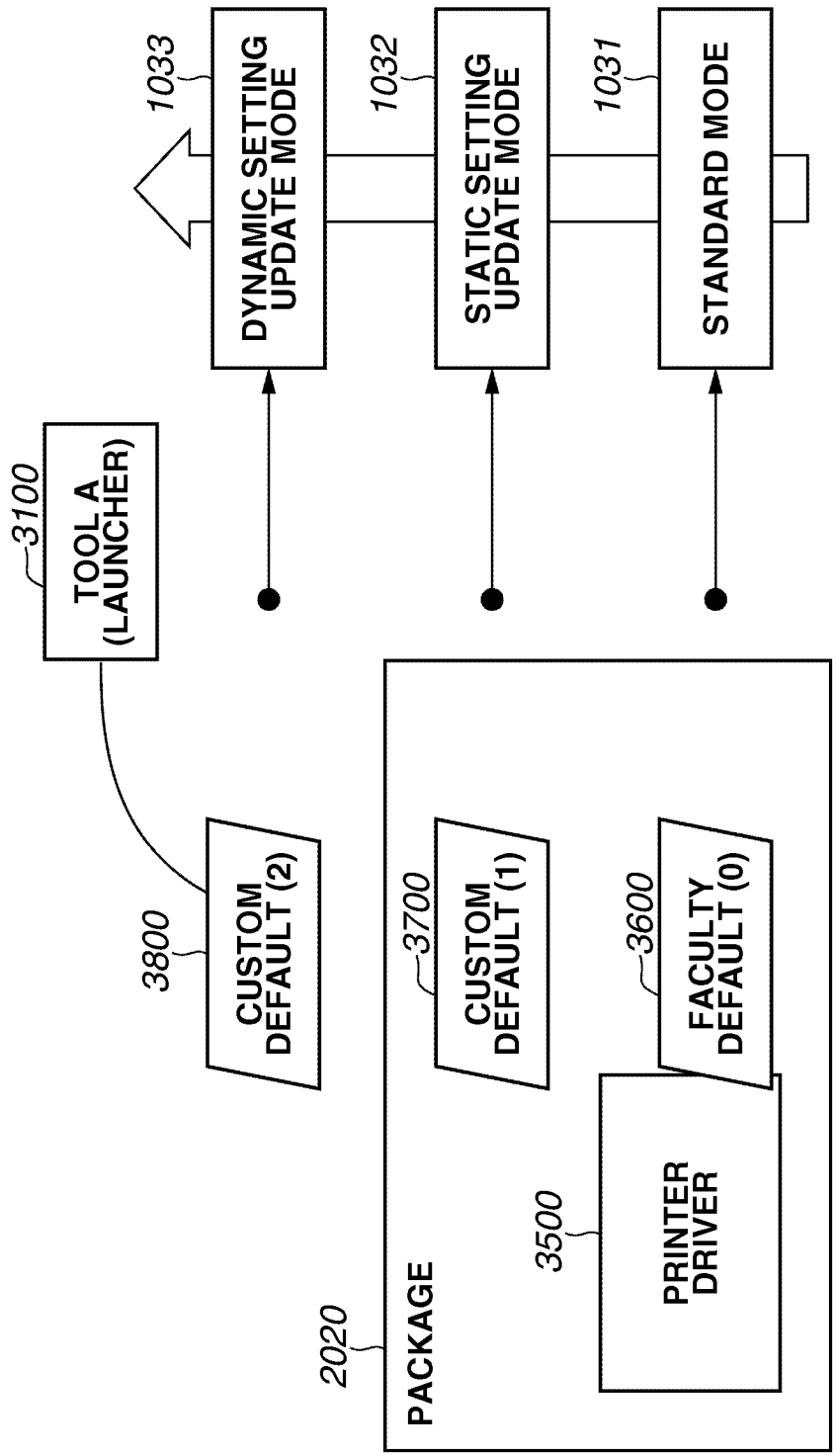

PRINTING CONTROL METHOD AND PRINTING CONTROL APPARATUS AND COMPUTER PROGRAM USING PROGRAM MODULE FOR VARYING PRINT SETTINGS

BACKGROUND OF THE INVENTION

1. Field of the Invention

The present invention relates to a printing control method and printing control apparatus.

2. Description of the Related Art

A user of a printer may face situations associated with printer management and costs. Even when a color printer is purchased, there is an increasing trend to suppress color printing functions and normally operate the printer using monochromatic printing.

Consequently, methods have been discussed to enable control of the settings for a printer driver and the settings for other output device drivers for each application. More specifically, a method has been proposed in which an application and a printer driver are detected and then an application, a printer driver and a print setting are managed in association with each other (refer to Japanese Patent Application Laid-Open No. 2008-165291). A method has also been proposed which uses a tool configured to customize a default setting for a printer driver. More specifically, the method provides an environment in which a default factory setting for a printer driver is statically varied (customized) from color settings to monochromatic settings, and the monochromatic settings are applied to normal printing operations (refer to Japanese Patent Application Laid-Open No. 2006-209195 and Japanese Patent Application Laid-Open No. 2006-309725).

SUMMARY OF THE INVENTION

The present invention is directed to a method including determining whether a program module for varying print settings for a printer driver is participating in print processing when the printer driver executes print processing; and switching apart of the print settings for the printer driver to the print settings according to the program module when the program module is participating in print processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a flowchart illustrating an example of the basic operation of a printer driver.

FIGS. 17A and 17B illustrate an example of a UI for a printer driver and a setting generation dialog box.

FIG. 20 illustrates an example of the relationship between an operation mode and print settings for a printer driver.

DESCRIPTION OF THE EMBODIMENTS

Various exemplary embodiments, features, and aspects of the invention will be described in detail below with reference to the drawings.

The present exemplary embodiment describes an example of a printing system provided with a computer and a printer. However the configuration of the printing system is not limited to such a system. In other words, the printing system may be a single apparatus, may be a system formed from a plurality of apparatuses, or may be a system executing processing in which a plurality of apparatuses are connected via a network such as a local area network (LAN) or a wide area network (WAN).

Figure 1:
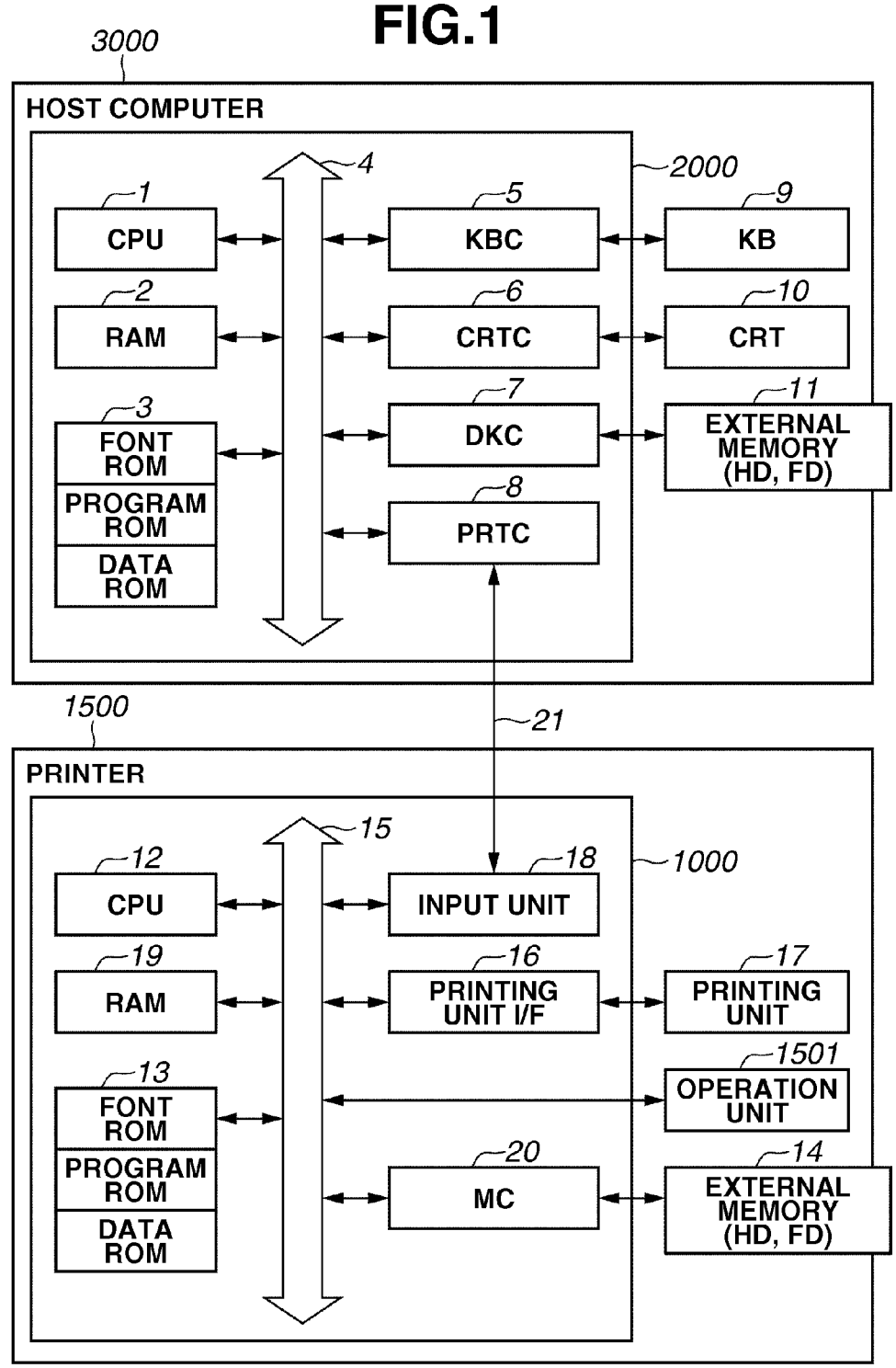
FIG. 1 is a block diagram illustrating an example of a configuration of a printing system.

FIG. 1 is a block diagram illustrating an example of the configuration of a printing system. In FIG. 1, a host computer 3000 is provided with a central processing unit (CPU) 1. The CPU 1 is configured to execute document processing programs stored in a program read only memory (ROM) of a ROM 3 or an external memory 11. The CPU 1 controls and executes a variety of processes for mixed documents such as figures, images, characters and tables (including spreadsheets). In addition, CPU 1 controls print processing based on such processes according to the present exemplary embodiment as described hereafter. The CPU 1 integrates control of each device connected to a system bus 4. An operating system program (OS) or the like which is a program configured to control the CPU 1 is stored in the program ROM of the ROM 3 or the external memory 11. Font data or the like used when processing the document are stored in the program ROM of the ROM 3 or the external memory 11. Furthermore various types of data used when processing the document or the like are stored in the program ROM of the ROM 3 or the external memory 11. A random access memory (RAM) 2 functions as a principal memory or work area for the CPU 1.

A keyboard controller (KBC) 5 controls key input via a keyboard 9 or a pointing device (not illustrated). A cathode ray tube controller (CRTC) 6 controls display by a cathode ray tube display (CRT display) 10. A disk controller (DKC) 7 controls access to the external memory 11 such as a hard disk (HD), flexible disk (FD), IC card or the like. The HD or FD stores boot programs, various types of applications, font data, user files, edited files and printer control command generating programs (hereafter termed "printer drivers"). A printer controller (PRTC) 8 is connected to a printer 1500 via a bidirectional interface (interface) 21 and executes communication control to the printer 1500.

The CPU 1 uses commands input using a mouse cursor (not illustrated) on the CRT 10 to open various preregistered windows and execute various types of data processing. When a user executes printing, a window related to the print settings is opened to enable execution of printer settings or enable setting (print setting) of a print processing method for a printer driver including selection of the printing mode.

A printer CPU 12 controls the printer 1500. The CPU 12 uses control programs stored in a ROM 13 or control programs stored in an external memory 14 to output an image signal as printing output information to a printing unit (printer engine) 17 connected to a system bus 15 via a printing unit I/F 16. A control program for the CPU 12 is stored in the program ROM of the ROM 13. Font data or the like used when generating printing output information are stored in the program ROM of the ROM 13. When using a printer not provided with an external memory 14 such as a hard disk, information or the like used on the computer is stored in the program ROM of the ROM 13.

The CPU 12 enables communication with a host computer 3000 via an input unit 18. In this manner, information or the like in the printer 1500 can be communicated to the host computer 3000. A RAM 19 is configured to function as a principal memory or work area for the CPU 12 and its memory capacity can be enlarged by an option RAM connected to an expansion port (not illustrated). The RAM 19 is used in an output information rasterizing area, environment data storing area, non-volatile RAM (NVRAM) or the like.

Access to an external memory 14 such as an HD, FD, IC card or the like is controlled by a memory controller (MC) 20. The external memory 14 may be optionally connected to the printer 1500 and stores font data, emulation programs, form data or the like. The printer 1500 has a NVRAM (not illustrated) and may store printer mode setting information from an operation unit 1501. The printer unit 17 in the present exemplary embodiment is an engine for an electrophotographic method in which printing data is finally recorded on media such as paper by dots of toner. The printing method is not limited to an electrophotographic method and, for example, includes any method executing printing by production of dots such as an inkjet method.

Figure 2:
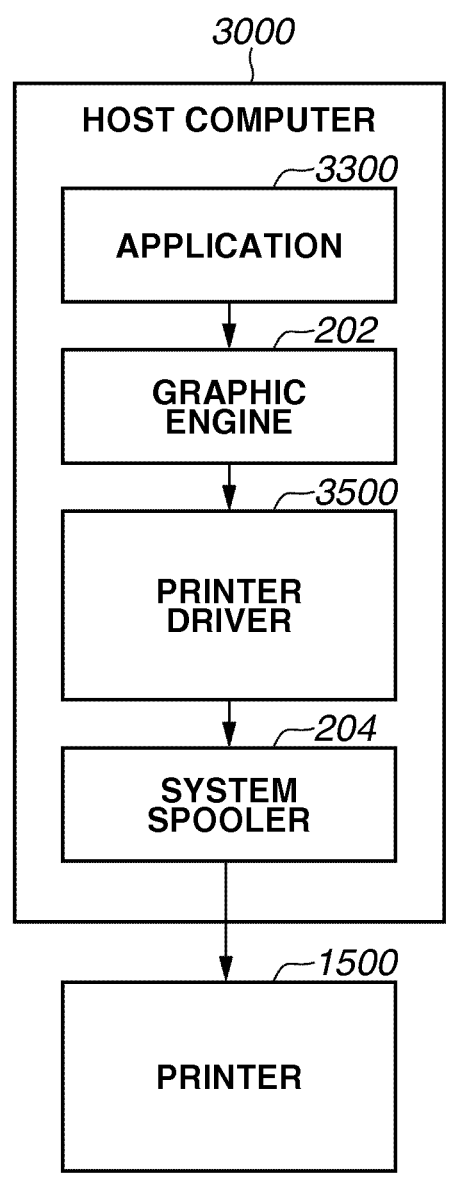
FIG. 2 illustrates an example of a basic configuration for print processing in a host computer.

FIG. 2 illustrates an example of a basic configuration for print processing in a host computer 3000. An application 3300, a graphic engine 202, a printer driver 3500 and a system spooler 204 are provided as files stored in the external memory 11. These files are program modules to be executed by loading into the RAM 2 by a module using the OS or its module. The application 3300 and the printer driver 3500 are loaded into the RAM 2 via a network (not illustrated) or the external memory 11. The application 3300 stored on the external memory 11 is executed by loading into the RAM 2.

When executing a print operation on the printer 1400 by the application 3300, output (rendering) of the print is executed by a graphic engine 202 which is similarly loaded onto the RAM 2 and is usable. The graphic engine 202 loads a printer driver 2400 prepared for each printing apparatus such as the printer 1500 onto the RAM 2 from the external memory 11 and sets the output of the application 3300 to the printer driver 3500.

An example of a print bus in Windows (Registered Trademark) will be described hereafter. The graphic engine 202 converts a graphic device interface (GDI) function received from the application 3300 to a device driver interface (DDI) function, which it outputs to the printer driver 3500. The printer driver 3500 uses the DDI function received from the graphic driver 202 to convert to a printer control command which can be recognized by the printer, for example, a page description language (PDL). A printer control command converted to PDL is output as printer data to the printer 1500 via an interface 21 and the system spooler 204 loaded onto the RAM 2 by the OS. Although the basic configuration of a print bus for Windows Vista (Registered Trademark) is the same as the print bus for Windows (Registered Trademark), Windows Vista (Registered Trademark) includes an additional XPS print bus in comparison to Windows (Registered Trademark). The graphic engine 202 in this XPS bus outputs common documents received from the application 3300 to the printer driver 3500. The printer driver 3500 converts the common documents received from the graphic engine 202 to a printer control command which can be recognized by the printer, for example, PDL. The printer control command converted to PDL is output as printer data to the printer 1500 via the interface 21 and the system spooler 204 loaded onto the RAM 2 by the OS.

Figure 3:
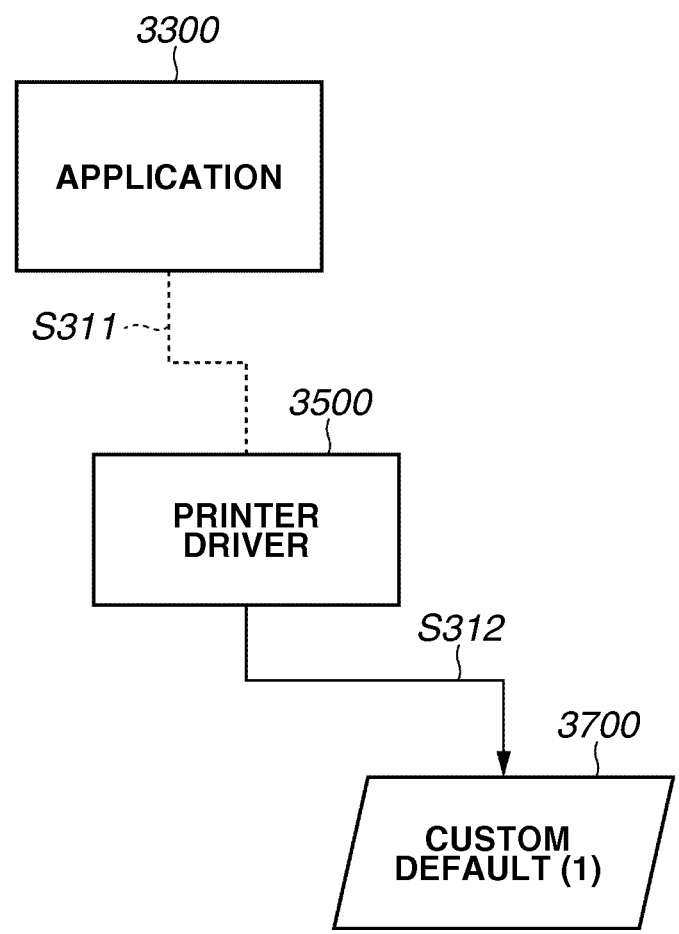
FIG. 3 is a schematic diagram illustrating an example of a method for executing printing using a printer driver which is statically customized.

FIG. 3 illustrates an example of a method for executing printing using a printer driver in which a part of print settings are statically customized. The application 3300 designates a printer during print operations. At this time, in a case of Windows (Registered Trademark), the device receives a print operation from the application 3300 and, in step S311, the graphic engine 202 loads the printer driver 3500. The printer setting data is set and initialized when the printer driver 3500 is loaded. In step S312, the printer driver 3500 loads, for example, the custom default (1) 3700 as print setting data and initializes the graphic engine 202. The print setting data (DEVMODE) includes print settings for the document such as the paper size, paper direction, selection of color printing/monochromatic printing, paper feeding method and copy number. The custom default (1) 3700 is data files stored in the external memory 11. These files are loaded into the RAM 2 by the module using the data or the OS.

An example of the normal operation sequence of the application 3300 is supplemented below referring to the example illustrated in FIG. 3. Firstly the application 3300 designates a setting in the graphic engine 202 according to the custom default (1) 3700 and opens the printer 1500. Then the application 3300 makes an inquiry about the size of the print setting data. The application 3300 ensures a buffer of the size of the print setting data and retains the print setting data in the buffer. In the example illustrated in FIG. 3 as described above, the print setting data is data of the custom default (1) 3700. Then the application 3300 designates the print setting data, acquires a printer device context and operates the printer device context to execute printing. Then the application 3300 discards the printer device context, releases the print setting data and executes the printer closing sequence. When the print processing is completed, the application 3300 discards and releases the used object or memory.

Figure 4:
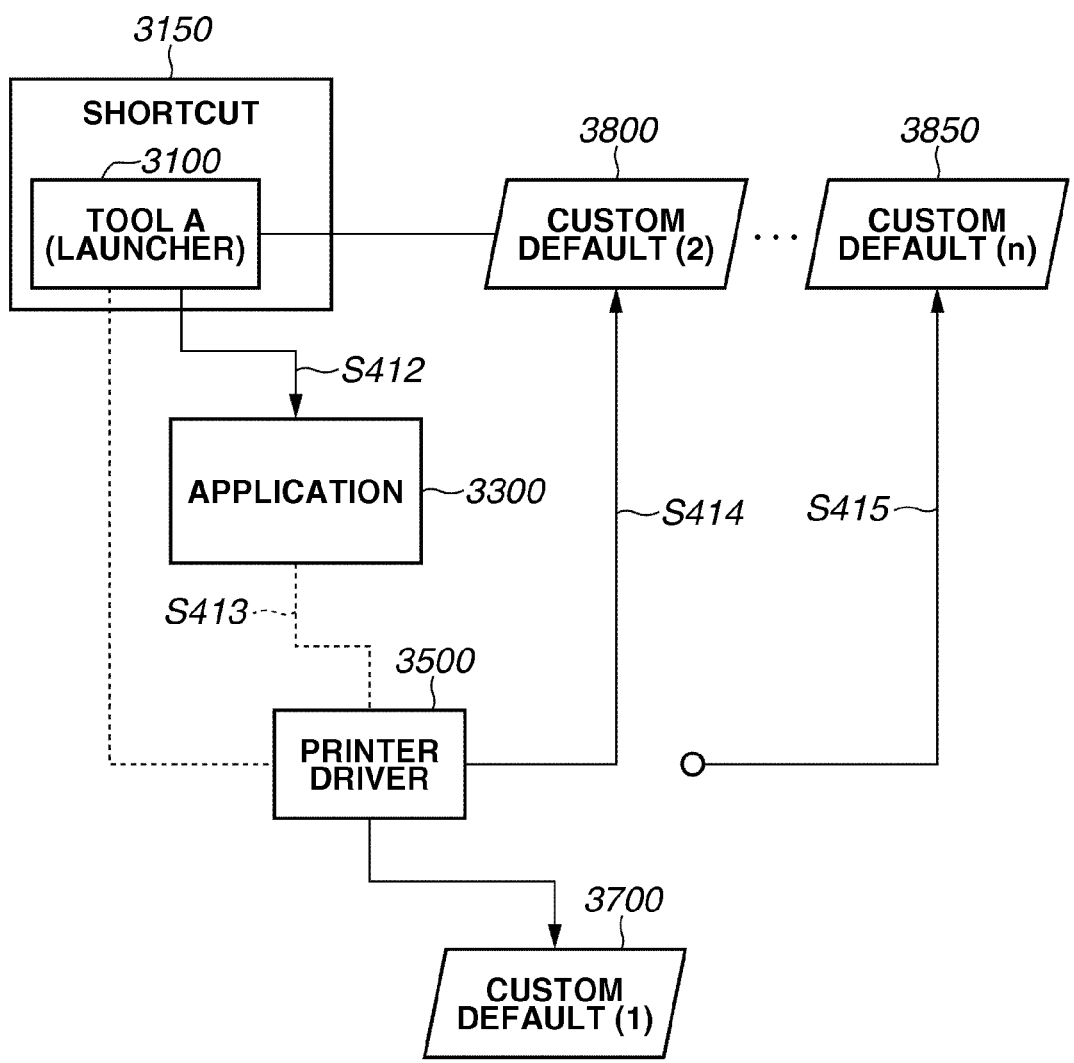
FIG. 4 is a schematic diagram illustrating an example of a method for executing printing using a printer driver in which a part of print settings are dynamically customized.

FIG. 4 schematically illustrates an example of a method for executing printing using a printer driver in which a part of print settings are dynamically customized. A tool A (launcher) 3100 is a file which is stored in the external memory 11. The tool A 3100 is a program module which is loaded onto the RAM 2 by the module using the OS or its module and interpreted and executed by the CPU 1. The tool A 3100 is loaded onto the RAM 2 via the external memory 11 or a network (not illustrated). The custom default (2) 3800-custom default (n) 3850 which are print data settings, and a shortcut 3150 are data files stored in the external memory 11. These files are loaded into the RAM 2 by the module using the OS or the data.

The overall process illustrated in FIG. 4 will be described. The tool A 3100 is linked with the print setting data. The tool A 3100 activates the application 3300. When printing is performed in response to the application 3300, the printer driver 3500 confirms whether or not the tool A 3100 is participating in the print processing. The tool A 3100 is participating in the example illustrated in FIG. 4. The printer driver 3500 loads print setting data (in this example, the custom default (2) 3800) linked to the tool A 3100. At this time, the printer driver 3500 does not load the custom default (1) 3700 which forms the print setting data in FIG. 3.

The process in FIG. 4 will now be described in sequence. When the shortcut 3150 is executed, the tool A 3100 is activated. In step S412, the tool A 3100 activates the application 3300. The activated application 3300 designates a printer 1500 for print processing. In this manner, in step S413, the printer driver 3500 is loaded onto the designated printer 1500. When the printer driver 3500 is loaded, initialization and setting of the print setting data is also executed. The printer driver 3500 confirms the participation of the tool A 3100. When processing by the tool A 3100 is detected, the printer driver 3500 determines that the tool A 3100 is participating. In step S414, the printer driver 3500 loads the custom default (2) 3800 which is linked to the tool A 3100 instead of the custom default (1) 3700 as print setting data. The tool A 3100 enables management of the linkage with a plurality of print setting data (enables variation of the linked print setting data). In step S415, if the custom default (n) 3850 is linked as print setting data to be used to the tool A 3100, the printer driver 3500 loads the custom default (n) 3850.

In other words, when the predetermined application is activated via the tool A 3100, the print settings related to the print processing performed by the predetermined application can be switched by the printer driver 3500 to print settings corresponding to the custom module. On the other hand, the printer driver 3500 can be adapted not to switch print settings related to print processing other than the application.

An example of the technical outline of the present exemplary embodiment has been described above.

Figure 5:
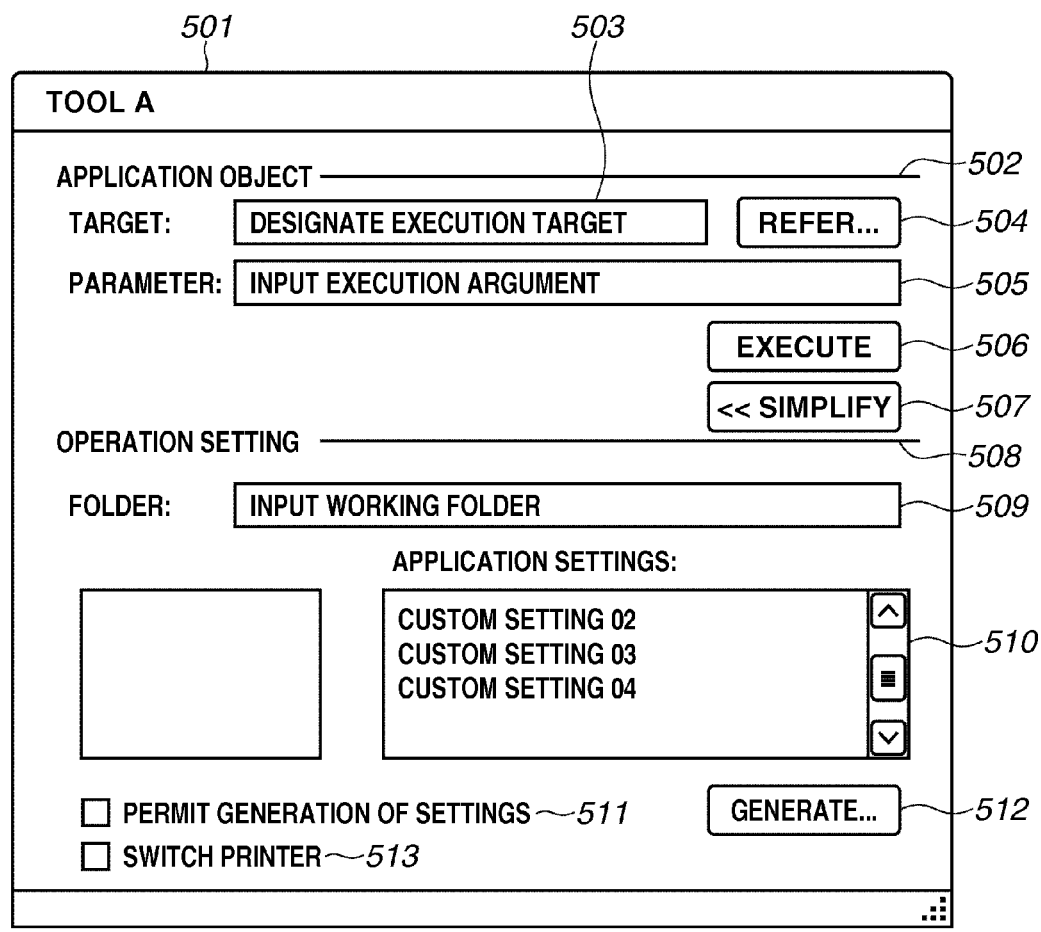
FIG. 5 illustrates an example UI for a tool A.

Next an example of user interface (UI) for the tool A 3100 will be described. A user (for example, a technician of a printer manufacturer) uses this UI to input setting items for the tool A 3100. FIG. 5 illustrates an example of a UI for the tool A 3100. The tool A 3100 can be executed without using the shortcut 3150 to open the UI illustrated in FIG. 5. The UI 501 illustrated in FIG. 5 is displayed when the tool A (launcher) 3100 is independently activated. The UI 501 includes an "application object" group box 502 configured to set the application target of the tool A 3100. The UI 501 includes an "operation setting" group box 508 configured to set the operation in the printer driver 3500. When expanded display is selected using the "simplify/expand" display switching button 507, the setting is input to the "operation setting" group box 508. When simplified display is selected using the "simplify/expand" display switching button 507, the setting is not input to the "operation setting" group box 508. In the example illustrated in FIG. 5, expanded display is selected by the "simplify/expand" display switching button 507.

Next, the "application object" group box 502 will be described. The application object of the tool A 3100 is designated by operation of the "target" edit box 503 or the "refer . . ." button 504. A "parameter" edit box 505 describes the input parameters (argument). The "parameter" edit box 505 can also describe command to make settings to be input to the "operation setting" group box 508. When the "simplify/expand" display switching button 507 is used to select simplified display, this type of command description is executed. Operation of the "execute" button 506 enables input to the "application object" group box 502.

Next the "operation setting" group box 508 will be described. A working folder is input to the "folder" edit box 509. The working folder stores print setting data and the like for the printer driver 3500. A list of setting data is displayed in the "application setting" list box 510. The following processing is executed if the "execute" button 506 is operated when expanded display is selected by the "simplify/expand" display switching button 507. In other words, when the tool A 3100 is executed, the contents input to the "operation setting" group box 508 is added to the input parameters described in the "parameter" edit box 505. The "permit generation of settings" check box 511, the "generate" button 512 and the "switch printer" check box 513 will be described separately hereafter. An example of the UI for the tool A 3100 has been given above.

Figure 6A:
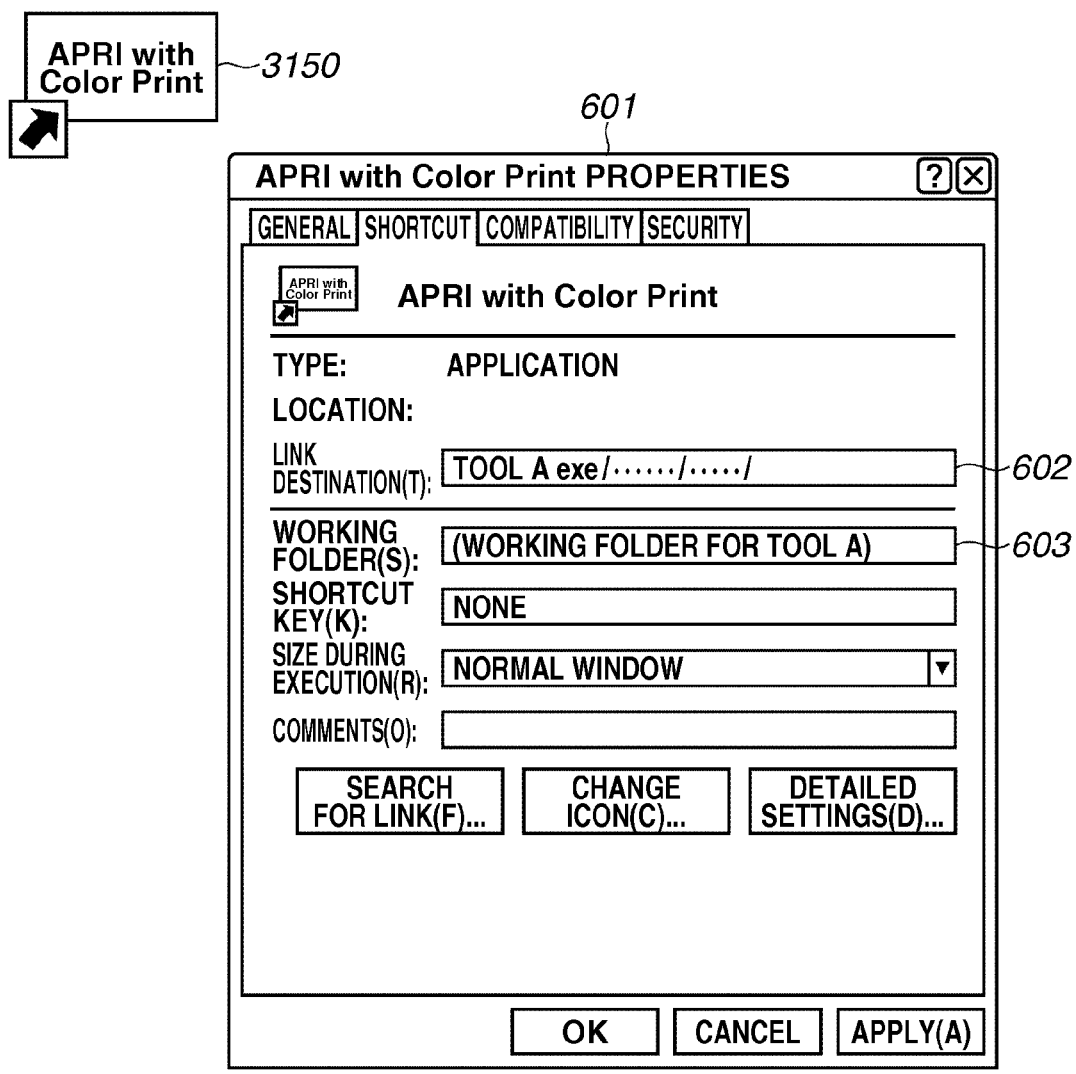
FIGS. 6A and 6B illustrate a schematic example of input/output processing to and from the tool A.
Figure 6B:
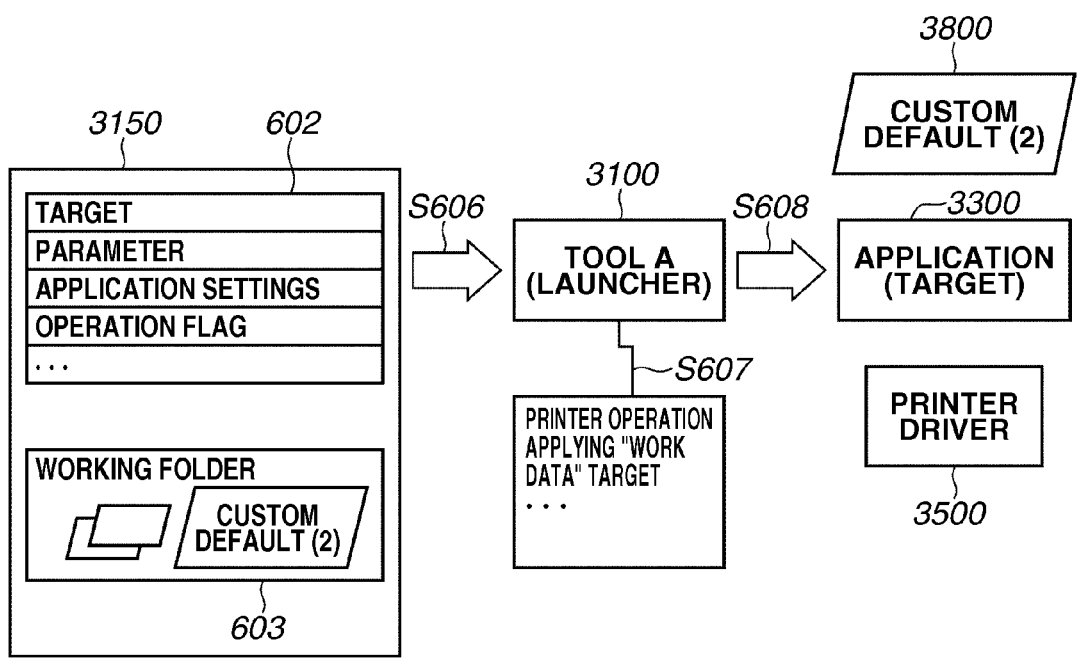

Next an example of input/output processing to the tool A 3100 when the tool A 3100 is executed using the shortcut 3150 will be described. FIG. 6 illustrates a schematic example of input/output processing to the tool A 3100. More specifically, FIG. 6A illustrates an example of the shortcut 3150 of the tool A 3100 and the shortcut properties 601. FIG. 6B is a schematic diagram illustrating the flow of input/output processing to the tool A 3100. In FIG. 6A, the execution and argument for the tool A (launcher) 3100 are respectively set in the box 602 and the working folder box 603. In FIG. 6B, in step S606, the shortcut 3150 is executed to input parameters set in the boxes 602, 603 into the tool A 3100. In step S607, the tool A 3100 interprets the parameters set in the boxes 602, 603 and uses the interpretation results to generate work data 607 in the RAM 2. Then in step S608, the tool A (launcher) 3100 uses the work data 607 to generate a linkage with the custom default (2) 3800, execute the application 3300 which is an example of the target and output information related to the control of the printer 3500 or the like. An example of input/output processing with the tool A 3100 has been described above.

Based on the description made so far, a further example of the basic operation of the printing system according to the present exemplary embodiment will be described below.

Figure 7:
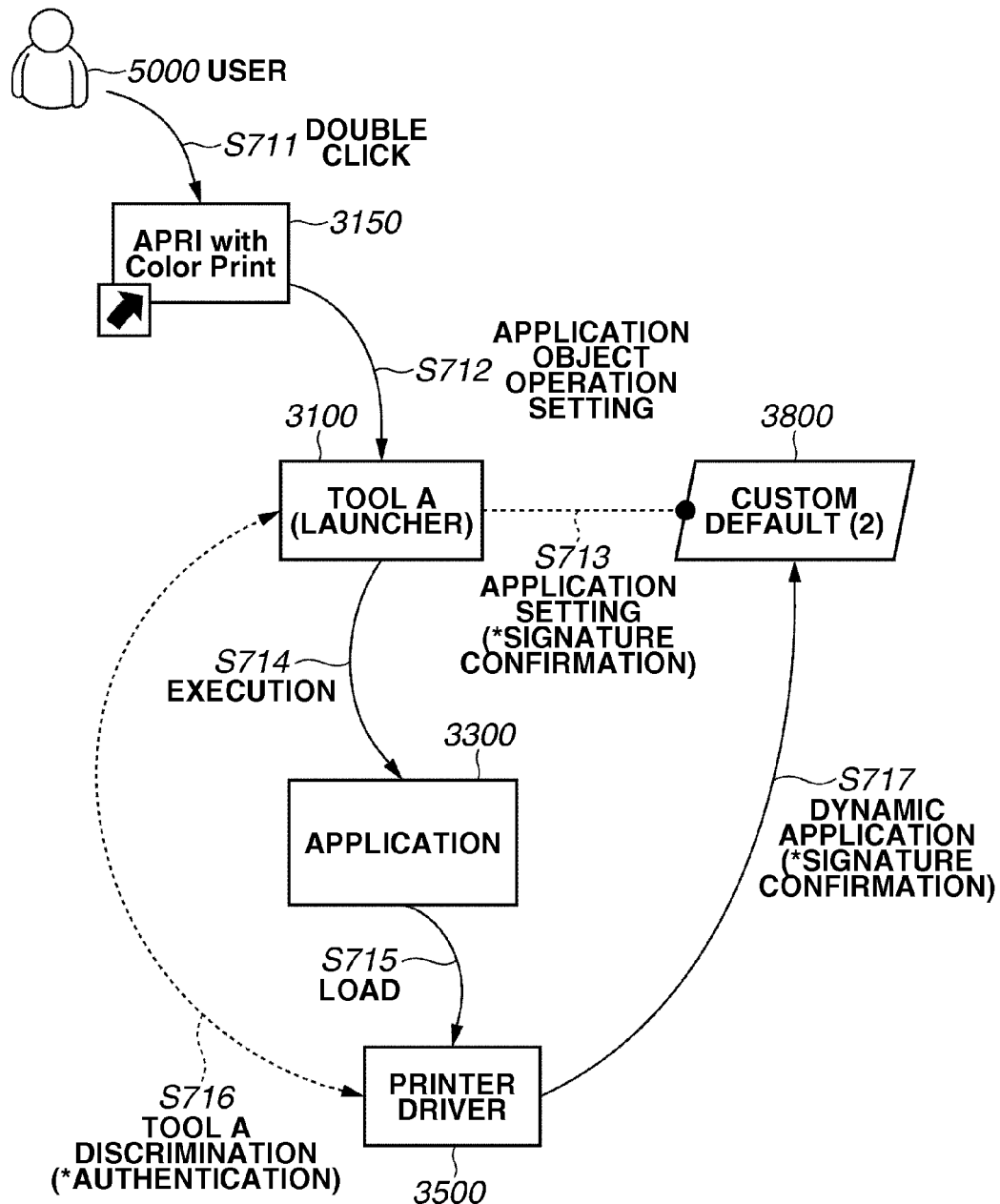
FIG. 7 illustrates an example of the flow of the basic operation of the printing system.

FIG. 7 illustrates an example of the flow of the basic operation of the printing system according to the present exemplary embodiment. In step S711, a user 5000 double clicks the shortcut 3150. As a result, in step S712, the execution of the tool A 3100 via the shortcut 3150 transfers input parameters such as the application object or the operation settings (print settings) to the tool A 3100. In step S713, the tool A 3100 uses the input parameters to generate a linkage to the custom default (2) 3800 itself as printer setting data to be used. Then in step S714, the tool A 3100 executes the application 3300 designated by the input parameters.

When the printing-related processing is initiated by the application 3300, in step S715, loading of the printer driver 3500, and initialization and setting of the print setting data are commenced. In step S716, the printer driver 3500 recognizes the process and specifies the participation of the tool A (launcher) 3100. The printer driver 3500 applies the custom default (2) 3800 linked to the tool A 3100 as print setting data. An example of processing indicated by the * mark in step S713, S716 and S717 will be supplementarily described hereafter. Furthermore, the custom default (2) 3800 referred to step S713 and 5717 is protected by a signature from the point of view of security. The authentication in step S716 is executed as a countermeasure against disguising for the tool A 3100. The method of authentication and signature may be suitably selected according to the security level. The signature and authentication may be realized by known methods and therefore detailed description of the security strategy for the * mark will be omitted from the description hereafter. An example of the flow of basic operations of the printing system according to the present exemplary embodiment was described above.

Figures 8A, 8B:
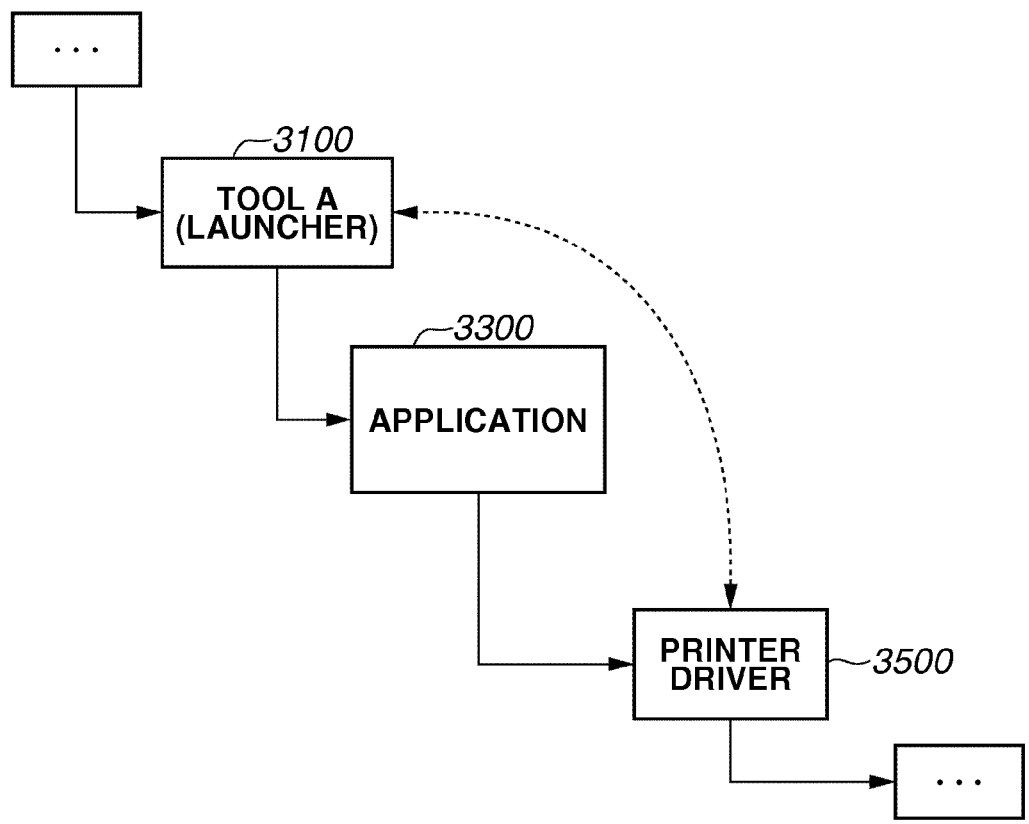
FIGS. 8A and 8B illustrate an example of a method for discriminating participation of the tool A in print processing.

Next, an example will be described of a method for enabling the printer driver 3500 to discriminate whether the tool A 3100 is participating in the execution of the print processing. FIG. 8 illustrates an example of a method for discriminating participation of the tool A in print processing. More specifically, FIG. 8A illustrates an example of a representative process tree 801 (process hierarchy) in the Windows (Registered Trademark) OS. FIG. 8B illustrates a portion of the process tree 801, the tool A 3100, the application 3300 and the printer driver 3500 illustrated in FIG. 8A. A user process is generated during service management or by the OS manager and, as illustrated in FIG. 8A, is used to operate the application 3300. It is assumed that the tool A 3100, the application 3300 and the printer driver 3500 are configured as illustrated in FIG. 8B. The printer driver 3500 generates a process tree in the RAM 2, specifies the tool A 3100 on the process tree and determines whether the tool A 3100 is participating in the print processing. On the other hand, if tool A 3100 is not specified by the generated process tree, the printer driver 3500 determines that the tool A 3100 is not participating in print processing.

An example of this type of processing of the printer driver 3500 is shown by a run of the item using Windows (Registered Trademark) API as follows.
(1) The printer driver 3500 specifies the process ID itself (GetCurrentProcessID( )).
(2) The printer driver 3500 generates a list of system processes (EnumProcesses ( )).
(3) The printer driver 3500 opens a process of the same ID as the process ID itself (OpenProcess ( )) and acquires a module name and base name (EnumProcessModules ( ), GetModuleBaseName ( )).
(4) When the printer driver 3500 acquires an object corresponding to the module name and the base name of the tool A 3100 recognized by the printer driver 3500 itself, the printer drive 3500 determines that the tool A 3100 is participating in the print processing. On the other hand, when the printer driver 3500 does not acquire an object corresponding to the module name and the base name of the tool A 3100 recognized by the printer driver 3500 itself, the printer drive 3500 determines that the tool A 3100 is not participating in the print processing.

According to the present exemplary embodiment, the printer driver 3500 executes at least the following determination. When a predetermined process ID issued by startup of the tool A 3100 which is an example of a program, is confirmed, it is determined that the program module related to the variation of the print setting for the printer driver 3500 is participating in the printing processing.

When coincidence is determined as described above, the base name is prioritized since even when the module name of the tool A 3100 is renamed for respective uses, the participation of the tool in the printing process can be accurately discriminated. An example has been described above, in which the printer driver 3500 uses the process tree 801 to discriminate whether or not the tool A 3100 is participating in the printing processing. However the discrimination process can also be initiated by the printer drier 3500 or by the tool A 3100. Furthermore a method for discriminating whether or not the tool A 3100 is participating in the printing processing may be employed as described below.
(1) It is determined that the tool A 3100 is participating in the print processing, by entering a unique keyword into the argument of the command and confirming that the keyword is contained in the argument of the command.
(2) It is determined that the tool A 3100 is participating in the print processing, by transmission of a specific message from the printer driver 3500 and confirmation of a response to the specific message.
(3) It is determined that the tool A 3100 is participating in the print processing, using the results of access by the printer driver 3500 to a service released by the tool A 3100. A discrimination unit for a tool participating in printing between the tool A (launcher) 3100 and the printer driver 3500 which have been already aligned, may be a different method. Furthermore the method may be switched (selected) to one of a plurality of methods. An example of a discrimination method for participation of the tool A 3100 in printing has been described above.

Figure 9:
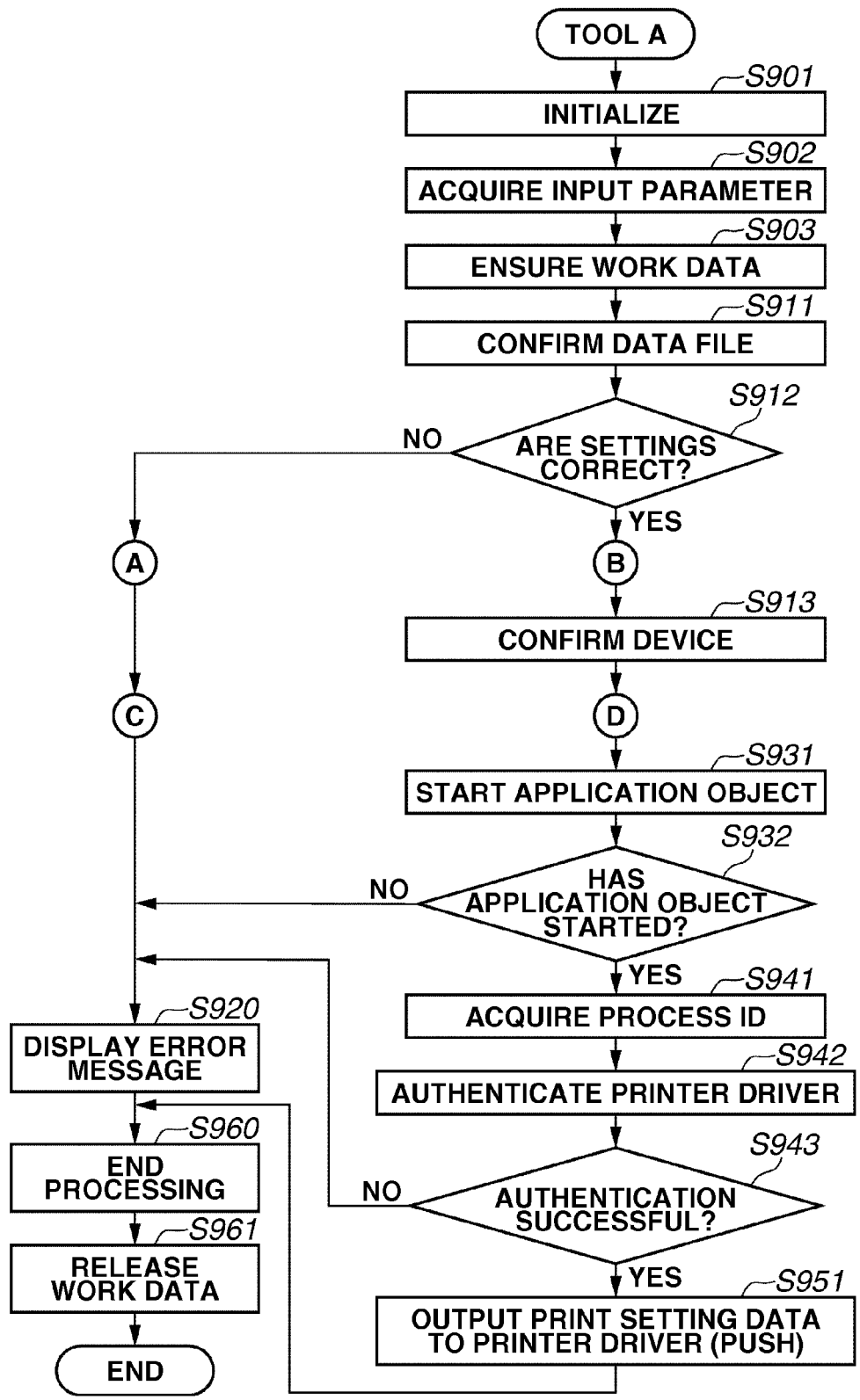
FIG. 9 is a flowchart illustrating an example of the basic operation of the tool A.

An example of a basic operation of the tool A 3100 and the printer driver 3500 will be described making reference to the flowchart. An example of discrimination of participation of the tool A 3100 in printing will be described using an example of a method employing the process tree above. An example of the basic operation of the tool A (launcher) 3100 will be described making reference to the flowchart in FIG. 9.

In step S901, the tool A 3100 is initialized. Then in step S902, the tool A 3100 acquires input parameters. In step S903, the tool A 3100 interprets the input parameters and confirms the work data 607 using the interpretation results. Then in step S911, the tool A 3100 confirms the data file designated using the input parameters. More specifically, the tool A 3100 confirms the presence or absence of a data file, the signature and the format. In step S912, the tool A 3100 determines whether or not the designation of the operation settings contained in the input parameters (print settings designated by the input parameter and applied to the printer driver 3500) are correct. The process in step S912 determines, for example, whether or not the print settings applied to the printer driver 3500 are linked to the tool A 3100. If the result of the determination indicates that the designation of the operation settings is not correct (for example, if the print settings applied to the printer driver 3500 are not linked to the tool A 3100), the process proceeds to step S920. In step S920, the tool A 3100 displays an error message in the CRT display 10. Thereafter the tool A 3100 executes end processing in step S960, releases the work data 607 in step S961 and ends the processing in the flowchart illustrated in FIG. 9. The processing which can be added to the connection points A and C in FIG. 9 will be described below.

In step S912, when the operation settings are correct, the process proceeds to step S913. Then in step S913, the tool A 3100 confirms the device. The confirmation step confirms whether or not the printer 1500 is installed. The process then proceeds to step S931. The processing which can be added to the connection points B and D will be described below. In step S931, the tool A 3100 activates the application object. Then in step S932, the tool A 3100 determines whether or not the application object has been activated. When it is determined that the application object has not been activated, the process proceeds to step S920. Then as described above, the tool A 3100 displays an error message on the CRT display 10 and ends the process in the flowchart in FIG. 9. On the other hand, when it is determined that the application object has been activated, the process proceeds to step S941.

In step S941, the tool A 3100 acquires its process ID. Then in step S942, the tool A 3100 executes an authentication with the printer driver 3500. Then in step S943, the tool A 3100 determines whether or not the authentication has been successful. When it is determined that the authentication has failed, the process proceeds to step S920 described above. As described above, the tool A 3100 displays an error message on the CRT display 10 and ends the process in the flowchart in FIG. 9. On the other hand, when it is determined that the authentication is successful, the process proceeds to step S951. In step S951, the tool A 3100 outputs (PUSH) print setting data to be applied to the printer driver 3500. When the printer driver 3500 can directly refer to the print setting data to be applied, the process in step S951 is not required. The process proceeds to step S960 as described above, the tool A 3100 displays an error message on the CRT display 10 and ends the process in the flowchart in FIG. 9.

An example of a basic operation of the printer driver 3500 will be described making reference to the flowchart illustrated in FIG. 10. Firstly in step S1011, the printer driver 3500 acquires its process ID. Then in step S1012, the printer driver 3500 generates a process tree 801. In the next step S1013, the printer driver 3500 opens the process for the same ID as its process ID and confirms an element having the same module name and base name as those of the tool A 3100 recognized by the printer driver 3500.

Then in step S1020, the printer driver 3500 uses the authentication results in step S1013 to determine whether or not the tool A 3100 is participating in printing. When it is determined that the tool A 3100 is not participating in printing, the process proceeds to step S1030. When it is determined that the tool A 3100 is participating in printing, the process proceeds to step S1021. In step S1021, the printer driver 3500 selects a dynamic setting update mode. Then in step S1030, the printer driver 3500 determines the mode. This determination step can employ the result obtained in step S2021 based on the presence or absence of a custom default (1) 3700 as illustrated in FIG. 4. When it is determined that the mode is standard (normal) mode, the process proceeds to step S1031. Standard mode is the mode in which the printer driver 3500 is operated using the default settings which are made when shipped from the factory. In step S1031, the printer driver 3500 executes a print process in standard mode. Then the process illustrated in FIG. 10 is ended.

When the result of the determination in step S1030 indicates that the mode is static settings update mode, the process proceeds to step S1032. Static settings update mode for example is a mode in which the printer driver 3500 is operated using setting based on custom defaults (1) 3700. In step S1032, the printer driver 3500 executes print process in static setting update mode. Then the process in the flowchart illustrated in FIG. 10 is ended.

When the determination results from step S1030 indicate that the mode is dynamic setting update mode, the process proceeds to step S1041. Dynamic setting update mode is the mode in which the printer driver 3500 is operated using settings based on the custom default (2) 3800. In step S1041, the printer driver 3500 executes an authentication process with the tool A 3100.

Then in step S1042, the printer driver 3500 determines whether or not the authentication was successful. When it is determined that the authentication has failed, the process returns to step S1030 described above and the mode is switched to another mode. In this case, for example, it is assumed that the new mode is standard mode (step S1031). On the other hand, when the authentication is successful, the process proceeds to step S1051. In step S1051, the printer driver 3500 acquires (PULL) print setting data to be applied to the tool A 3100. When the printer driver 3500 can directly refer to the print setting data to be applied, the process in step S1051 (PULL for setting data from tool A 3100) is not required. Then in step S1052, the printer driver 3500 applies the print setting data to complete the process in the flowchart illustrated in FIG. 10. An example of the basic operation of the printer driver 3500 and the tool A (launcher) 3100 has been described above.

Figure 11A:
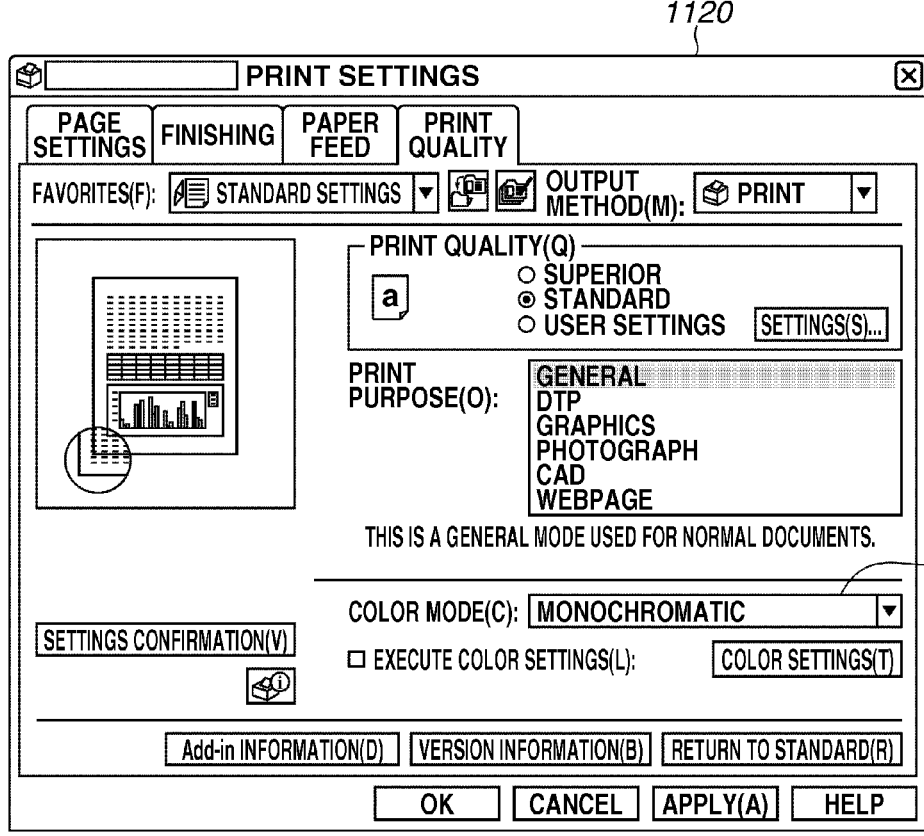
FIGS. 11A and 11B illustrate an example of a UI for a printer driver.
Figure 11B:
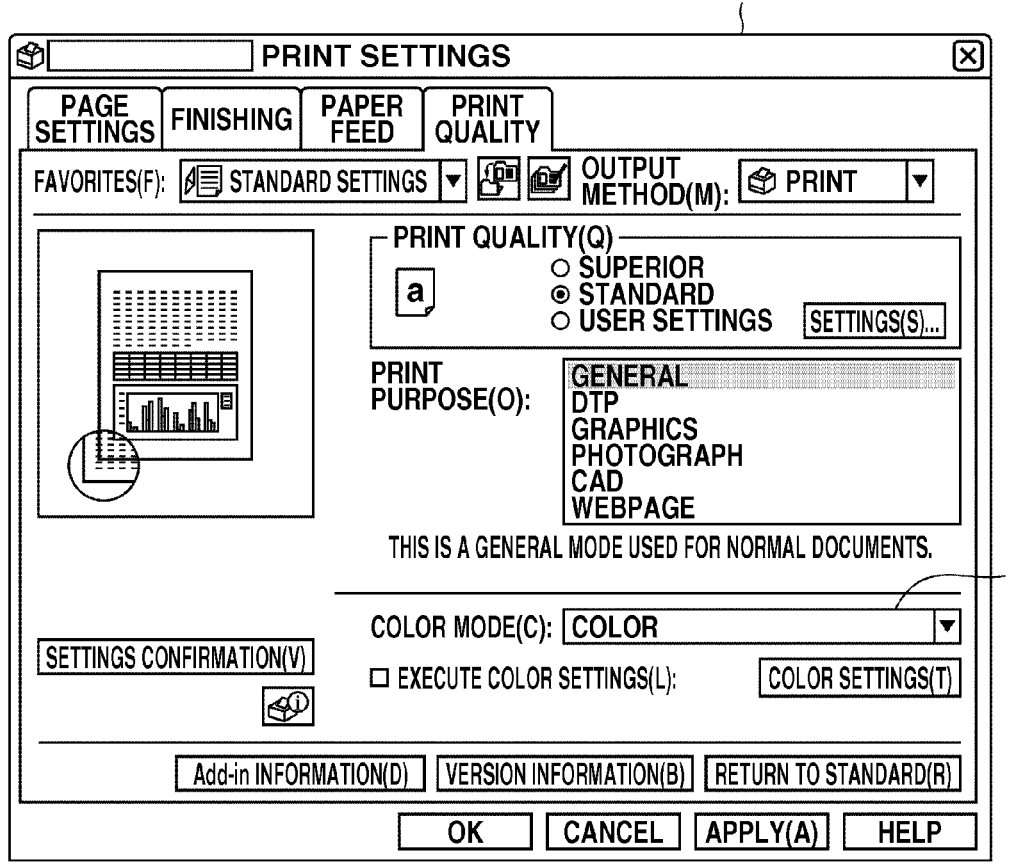

Next an example of the result when operating the printing system will be described. FIG. 11 illustrates an example of a UI for the printer driver 3500. More specifically, FIG. 11A illustrates an example of a UI for the printer driver 3500 displayed in the state illustrated in FIG. 3. FIG. 11B illustrates an example of a UI for the printer driver 3500 displayed in the state illustrated in FIG. 4. In FIG. 11A, the printer driver 3500 applies the custom default (1) 3700 as print setting data. The color settings for the custom default (1) 3700 is monochromatic. Thus when the UI 1120 of the printer driver 3500 is opened by the application 3300, the "color mode" is set as "monochromatic" 1121.

On the other hand, in FIG. 11B, the printer driver 3500 applies the custom default (2) 3800 linked to the tool A 3100 as print setting data. The color setting custom default (2) 3800 is color. Thus when the UI 1140 of the printer driver 3500 is opened by the application 3300, the "color mode" is set as "color" 1141. As described above, even when the UI of the same printer driver 3500 is opened by the same application 3300, dynamic switching of the print settings for the printer driver 3500 can be performed such that when the tool A 3100 participates, color printing is executed and when the tool A 3100 does not participate, monochromatic printing is executed. An example has been described above of the result when the printing system in the present exemplary embodiment is applied.

Figure 12A:
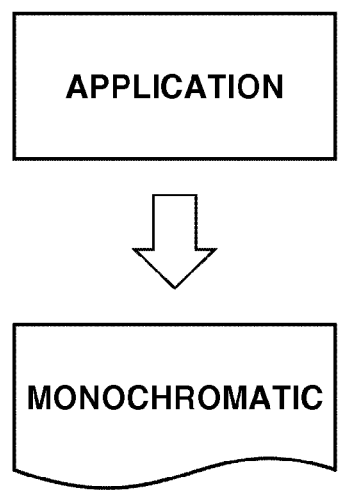
FIGS. 12A and 12B illustrate an example of a configuration (application example) of a printing job.
Figure 12B:
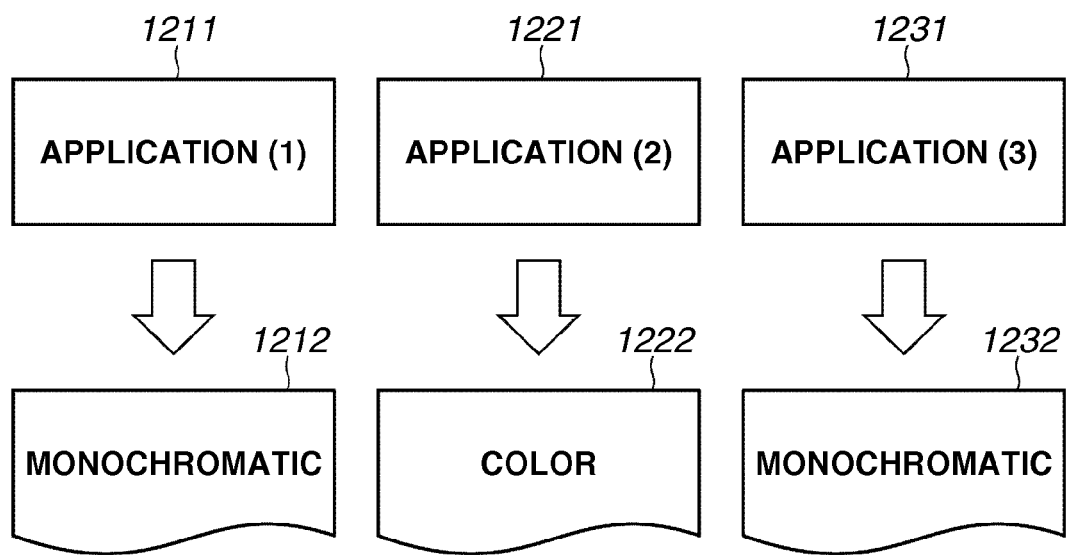

Next, the benefits of the printing system according to the present exemplary embodiment will be described. FIG. 12 illustrates an example of a configuration (application example) of a printing job. More specifically, FIG. 12A illustrates an example of a normal printing job (operation). FIG. 12B illustrates an example of a routine printing job which differs from a normal printing job.

As illustrated in FIG. 12A, although a color printer is attached to the printing system, normally the color printer is operated to execute monochromatic printing. On the other hand, in a routine printing job as illustrated in FIG. 12B, three documents transferred to a client are printed as one set. Among this set of documents, there is a document 1222 which contents are suitable for color printing and are to be transferred to the client in color. The color document 1222 is generated and printed using the application (2) 1221. The other documents 1211, 1232 are monochromatic documents. Executing printing of the three documents in an order of 1212, 1222, and 1232 in a routine job format is performed while avoiding situations associated with printing settings.

Herein, it is assumed that there is no limit such that the application (2) 1221 can only be used during color document printing. In other words, the application (2) 1221 may be an application which is used during normal operation or may be the same application as the application (1) 1211 or the application (3) 1231.

Figure 13:
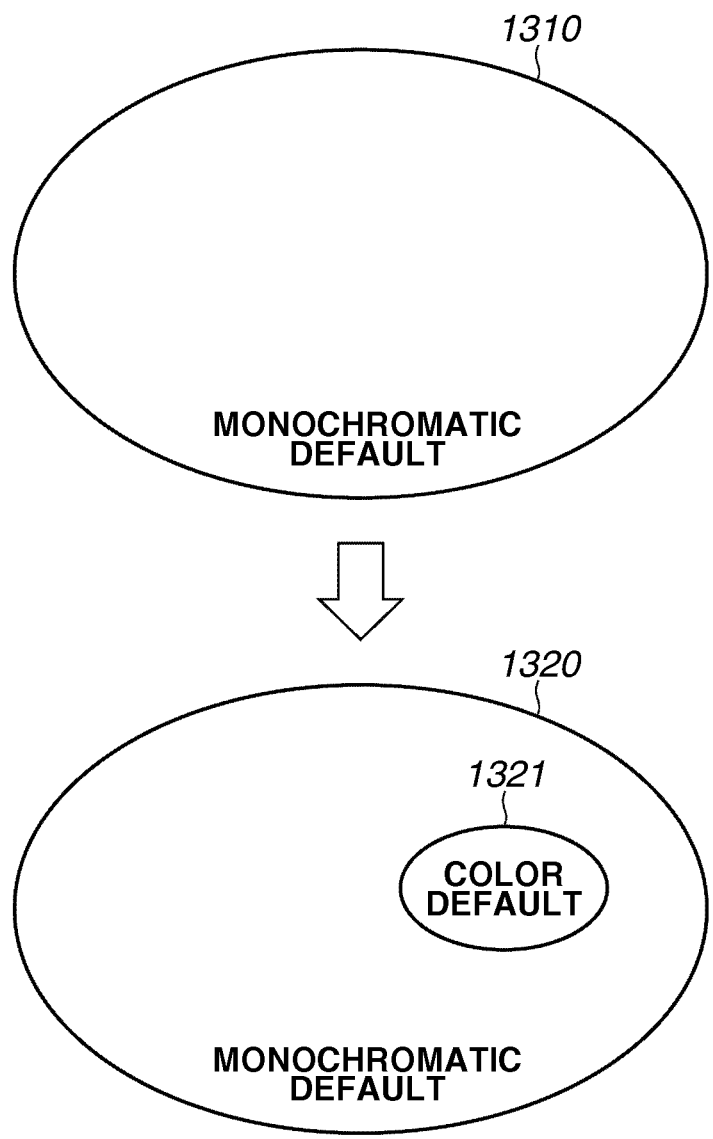
FIG. 13 schematically illustrates the operation illustrated in FIGS. 12A and 12B.

FIG. 13 schematically illustrates the operation illustrated in FIG. 12A and the operation illustrated in FIG. 12B. The details of both operational formats (application examples) may be summarized as follows.
(1) Normal internal jobs are executed monochromatically.
(2) A part of documents for external use are executed in color.
(3) The application and color printing are not limited and associated with each other.
(4) Switching operations for printer settings for each document such as monochromatic→color→monochromatic should be avoided.

In FIG. 13, normal print settings 1310 for the printer driver 3500 execute monochromatic printing in all areas. Even a color printer executes monochromatic printing when using normal print settings. The normal print setting 1310 designate the custom default (1) 3700 which sets monochromatic printing. On the other hand, print settings 3120 for the printer driver 3500 when the tool A 3100 is participating, enable both applications cases of normal jobs and routine jobs. Such settings are used when only a part of the documents for external use are color printed and the other documents are printed monochromatically. When the printing system according to the present exemplary embodiment as described so far is applied, switching from monochromatic mode to color mode in a specific case is possible without performing an operation such as that described in (4) above. The print setting 1320 of the printer driver 3500 when the tool A 3100 is participating during a normal job uses the custom default (1) 3700 which sets monochromatic printing. In contrast, in routine jobs, the custom default (2) 3800 (1321) which sets color printing is applied as a print setting for specific documents to be color-printed.

In other words, in the present exemplary embodiment, when the application 3300 which is the application object of the tool A 3100 is activated, the printer driver 3500 for the printer 1500 designated by the application 3300 is loaded. When the printer driver 3500 determines that the tool A 3100 is participating in printing, the custom default (2) 3800 linked to the tool A 3100 is applied as a part of the print setting data. Consequently the present exemplary embodiment provides a tool A 3100 and a printer driver 3500 to realize localized customizing of settings for the printer driver 3500 when executing printing by on-demand switching of the print settings of the printer driver 3500. Therefore even during execution of the same application 3300, monochromatic printing is performed when the tool A 3100 does not participate and when the tool A 3100 participates, print settings for the printer driver 3500 can be switched to execute color printing without the need for a user operation.

The benefits of a printing system according to the present exemplary embodiment will be summarized hereafter. Firstly a method configured to dynamically customize print settings is provided from a print process side. Thus (1) print settings can be switched for a specific job. (2) Operation is enabled for both normal applications and specific applications. (3) A reduction in user operations is achieved. (4) Operational integration is maintained. More precisely, normal printing is executed in monochromatic format and only documents for presentation to a user are color printed. Localized and dynamic control of the print settings for a printer driver 3500 can be performed and these settings can be combined with wide static print settings. Furthermore since participation of the tool A 3100 enables dynamic customization of print settings for the printer driver 3500, the number of user operations when printing for a specific purpose can be reduced. Uniformity of operations can be obtained.

Furthermore flexible customization (switching) of print settings for the printer driver 3500 can be performed. For example, settings and control can be performed for printing in modes other than color modes. For example, cost reductions during document printing can be realized by normally using two-sided printing and only using one-sided printing for specific documents for presentation to clients. For example, simultaneous execution of switching between color/monochromatic printing and one-sided/two-sided printing can be performed. In other words, a normal document can be printed by monochromatic two-sided printing while one-sided color printing is carried out only for specific documents for presentation to clients. In addition, low-cost solutions can be provided in a short term. More specifically, only a portion of the print settings of the printer driver 3500 can be customized in a short term by controlling the print settings of the printer driver 3500 without changing the application.

Next, two modified examples of the flow of operations in a printing system according to the present exemplary embodiment will be described. Although the application object (target) was the application 3300 in the description above, the application object may be a document or shortcut or the like. Although an input parameter designating the target may be set as a pair of an application and a document, in this case, the input parameters are not set as a pair. The tool A 3100 may be provided singly or included as a set with the printer driver 3500. If the shortcut 3150 of the tool A 3100 is provided on a computer desktop and executed by a user 5000, the setting linked to the tool A 3100 can be applied to the printer driver 3500. The job system also enables switching of the print settings of the printer driver 3500 by generation and execution of a "shortcut linked to settings to be applied". The job system can also enable direct execution of input parameters to the tool A 3100.

Figure 14:
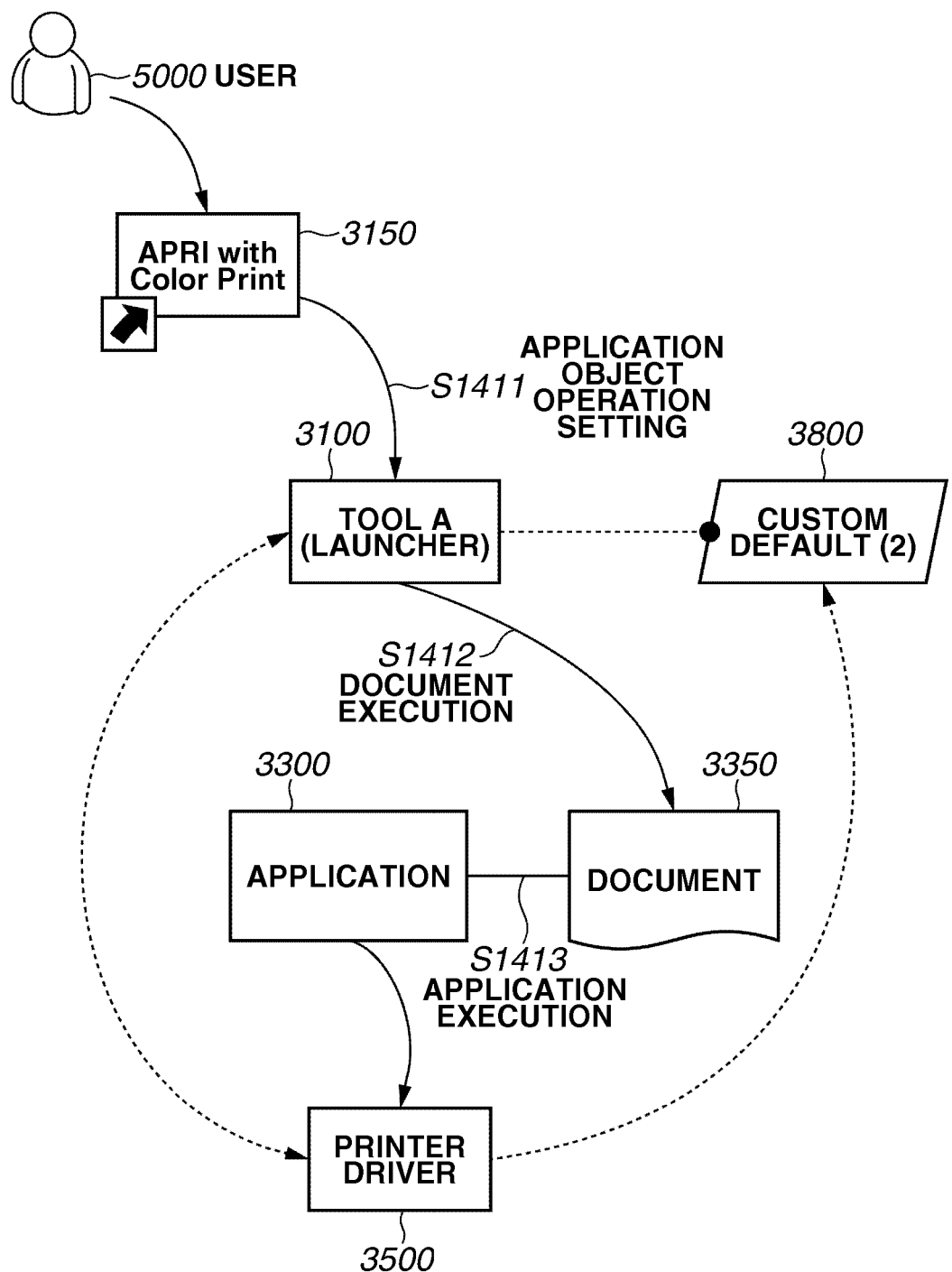
FIG. 14 illustrates an example of the basic operation flow of a printing system when an application object is a document.

FIG. 14 illustrates an example of the flow of the basic operations of a printing system when an application object is a document. In step S1411, when a user 5000 double clicks the shortcut 3150, input parameters identifying the document 3350 as the application object are transferred from the shortcut 3150 to the tool A 3100. Then in step S1412, the tool A 3100 executes the document 3350 designated by the input parameters as the application object and in step S1413, the application 3300 corresponding to the document 3350 is activated. In other respects, the operation is the same as the description above and therefore detailed description will not be repeated (refer to FIG. 7).

Figure 15:
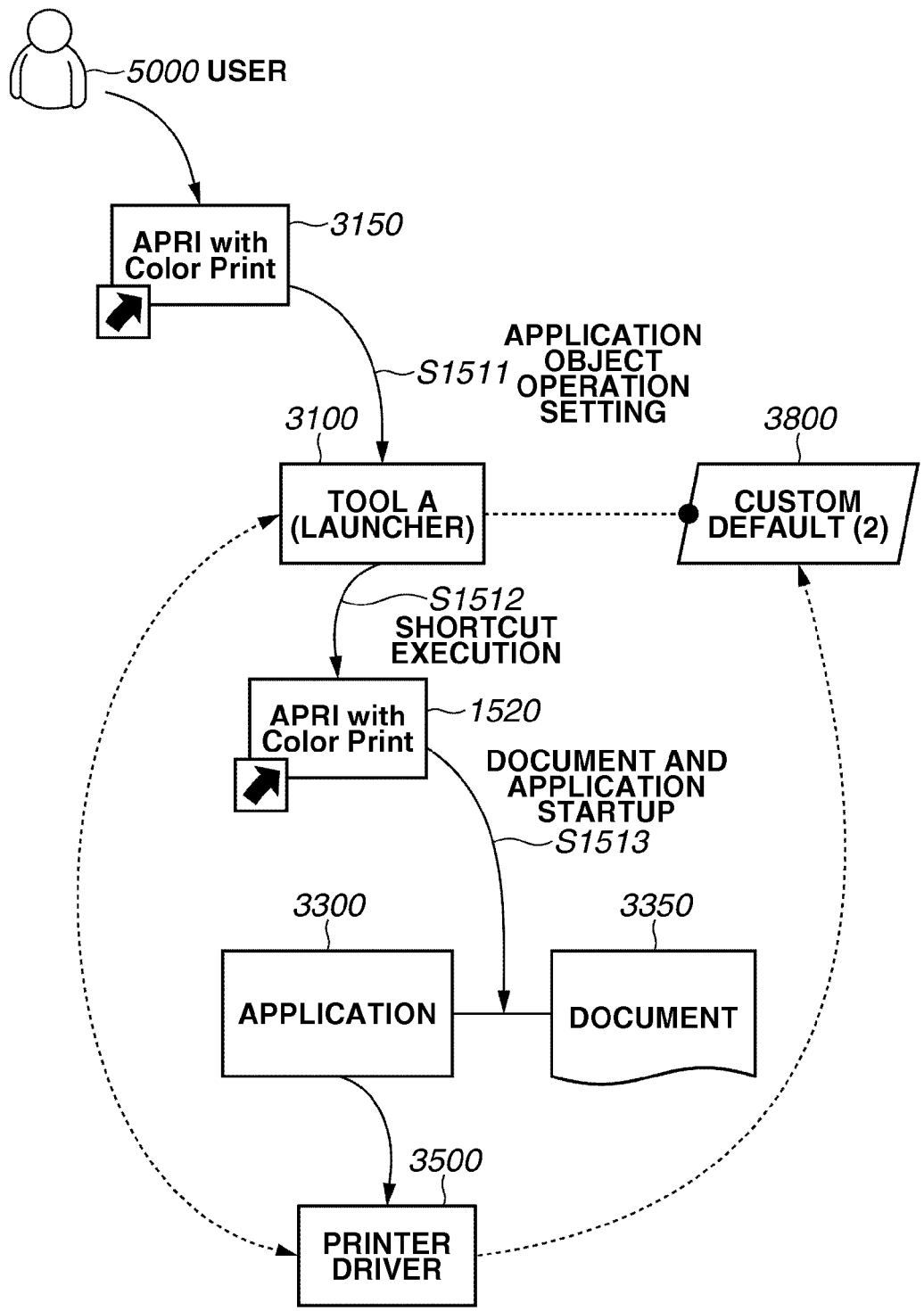
FIG. 15 illustrates an example of the basic operation flow of the printing system when the application object is a shortcut.

FIG. 15 illustrates an example of the flow of the basic operations of the printing system when the application object is a shortcut. In step S1511, when a user 5000 double clicks the shortcut 3150, input parameters identifying the shortcut 1520 as the application object are transferred from the shortcut 3150 to the tool A 3100. Then in step S1512, the tool A 3100 executes the shortcut 3150 designated by the input parameters as the application object. The shortcut 1520 is a shortcut of the application 3300 and the document 3350. The shortcut 1520 is a data file stored in the external memory 11. The shortcut 1520 is loaded onto the RAM 2 by a module using data or the OS. When the shortcut 1520 is executed, in step S1513, the application 3300 and the document 3350 are activated. In other respects, the operation is the same as described above and therefore detailed description will not be repeated (refer to FIG. 7). Two modified examples of the flow of operations of the printing system in the present exemplary embodiment have been described above. So far, the basic operations of the printing system according to the present exemplary embodiment have been described.

Figure 16:
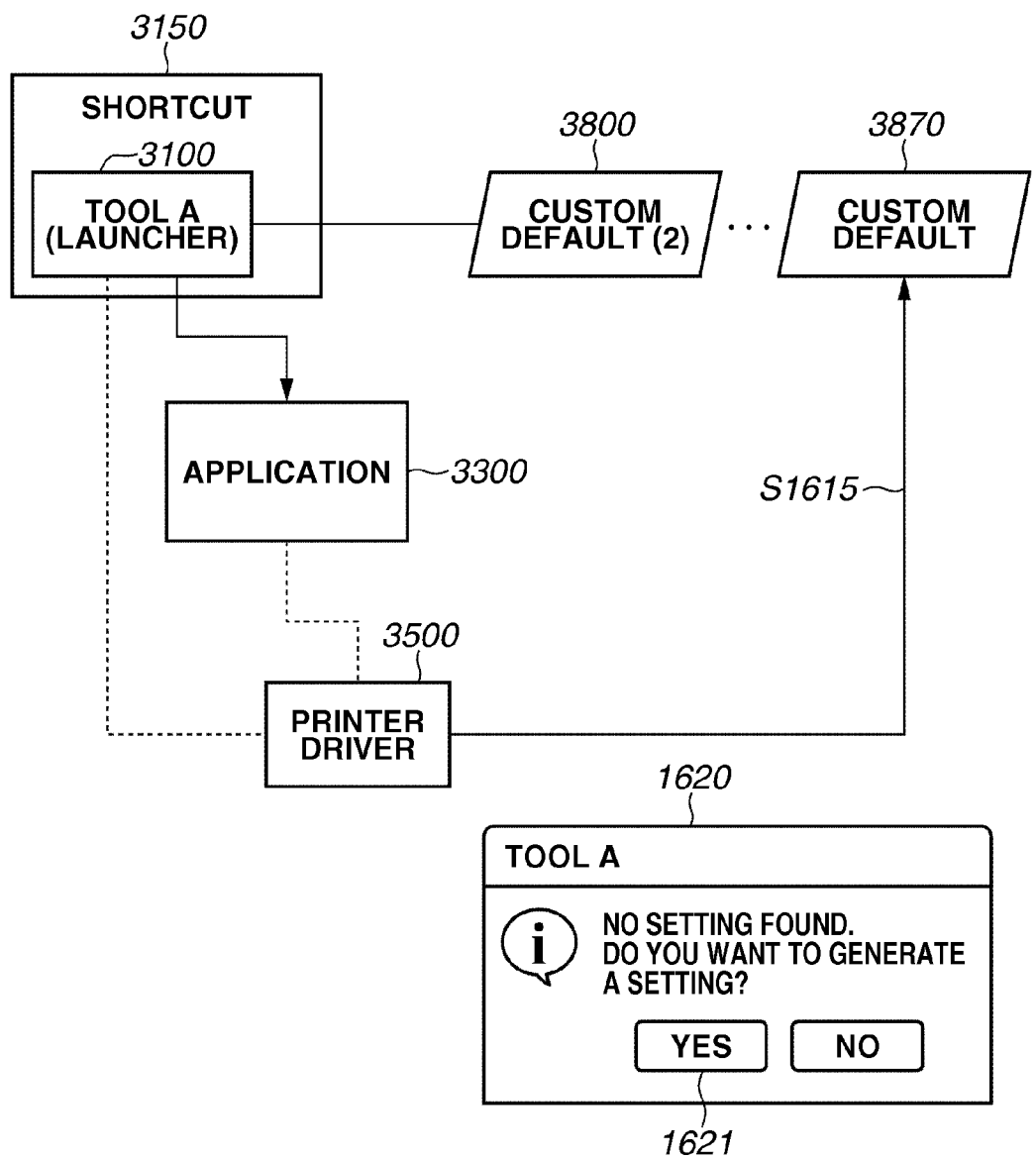
FIG. 16 illustrates an example of an operation for generating print settings for a printer driver.

Next an example of the operations configured to generate print settings for the printer driver 3500 in the printing system according to the present exemplary embodiment will be described. FIG. 16 illustrates an example of an operation configured to generate print settings for the printer driver 3500. The check box 511 displaying "generation of settings permitted" illustrated in FIG. 5 is set to ON to place the "generate" button 512 in an operable state. Consequently, print settings for the printer driver 3500 can be generated. Furthermore in the printing system according to the present exemplary embodiment, printing settings are generated and applied during printing when the settings designated by the "application object" group box 502 are not present. The tool A 3100 is linked to the print setting data. In the printing system according to the present exemplary embodiment, when there is no linkage of the printing setting designated by input parameters to the tool A 3100, the print settings are applied (in the example illustrated in FIG. 16, the custom default (2) 3800). On the other hand, although the input parameters have designated the custom default 3870 as print settings to be applied, it is assumed that there is no corresponding data for the custom default 3870. In this case, the tool A 3100 displays a message box 1620 and confirms whether or not print settings for the printer driver 3500 have been generated for a user. When a user selects the "yes" button 1621 in response to the message box 1620, the tool A 3100 displays the same setting generation dialog box as that displayed by pressing the "generate" button 512. The user operates the setting generation dialog box to generate print settings (custom default 3870). In step S1615, the generated custom default 3870 is applied as print settings. An example of the method of generating print settings for a printer device has been described above.

Figure 17B:
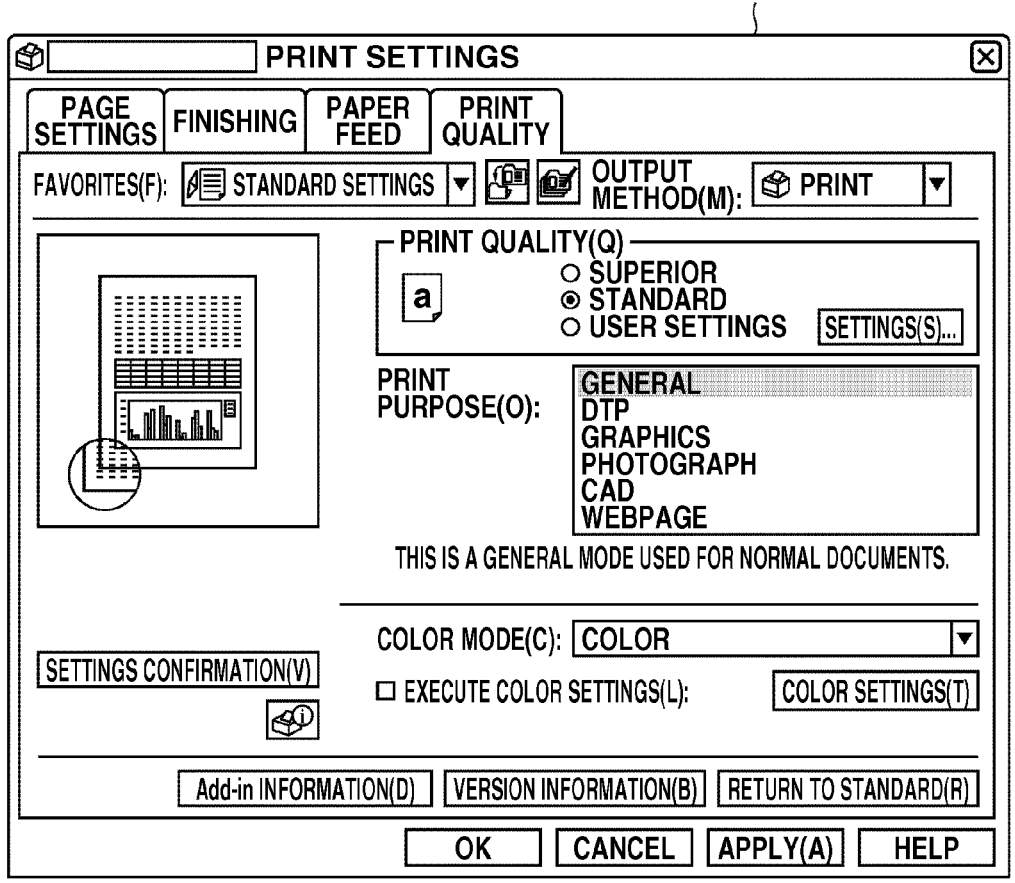

Next an example of the UI displayed during generation of print settings will be described. FIG. 17 illustrates an example of a setting generation dialog box (FIG. 17A) and an UI for a printer driver (FIG. 17B). When there is no print setting applied to the printer driver 3500 (when the "yes" button 1621 of the message box 1620 illustrated in FIG. 16 is pressed), a user operates the UI for the printer driver 3500 and the tool A 3100 to generate print settings. In FIG. 17, the setting generation dialog box 1710 is displayed by the tool A 3100. The setting generation dialog box 1710 displays a setting group box 1720 and an information group box 1730. In the setting group box 1720, a category range is set to setting data (DEVMODE) to be generated. When a user presses the "set . . . " button 1725, the UI 1726 of the printer driver 3500 is opened. A user generates settings by operation of the UI 1726 of the printer driver 3500. Various types of information for application to the print setting data can be set in the information group box 1730. A user presses the "save" button 1740 to complete operation of the setting generation dialog box 1710 and save the generated print settings, for example, in the external memory 11. An example of the UI displayed during generation of print settings has been described above.

Figure 18:
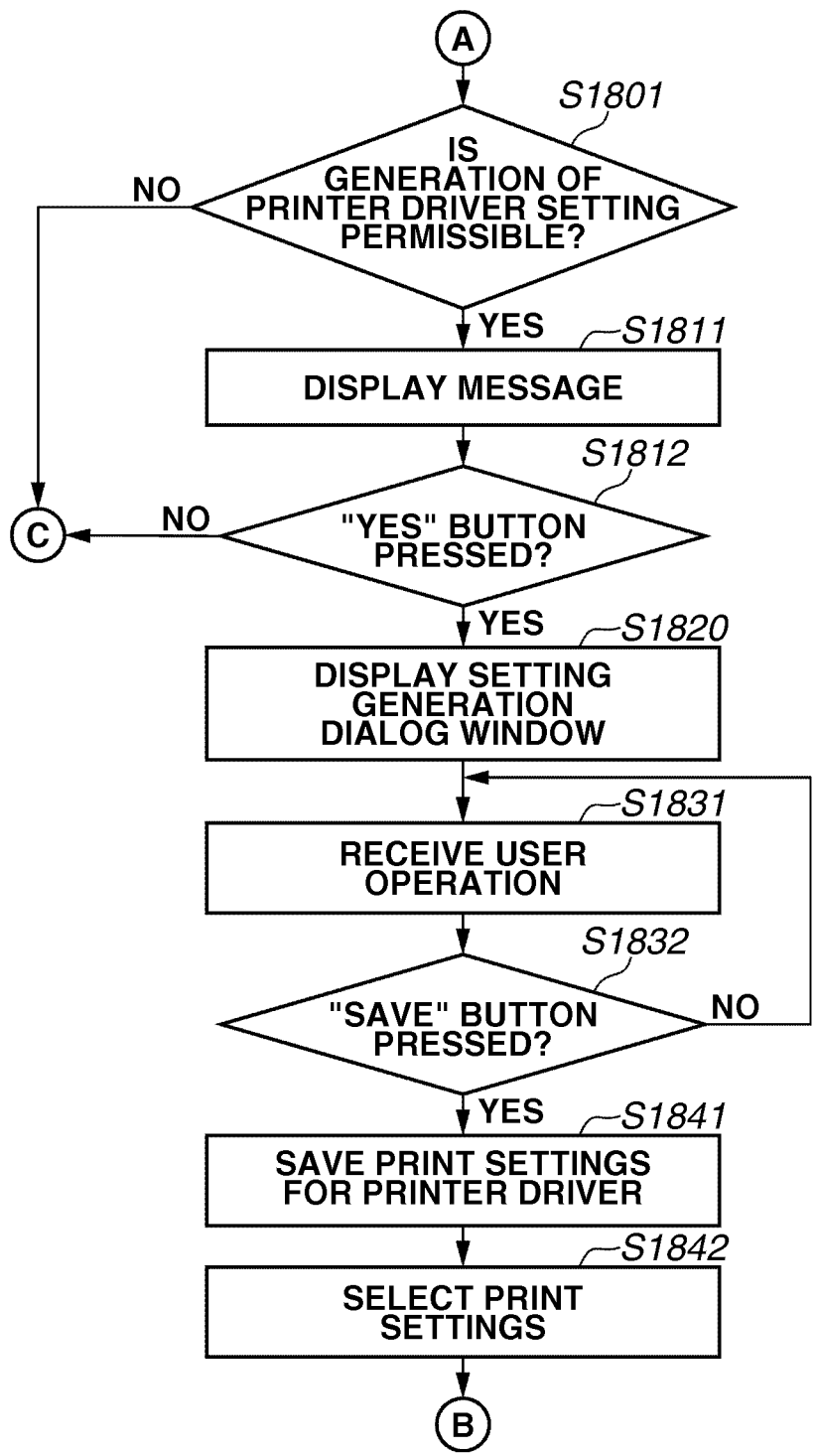
FIG. 18 is a flowchart illustrating an example of the operation of the tool A when generating print settings for a printer driver.

An example of the operation of the tool A when generating print settings for a printer driver 3500 will be described hereafter making reference to the flowchart illustrated in FIG. 18. This flowchart is added between the connection points A-B in the flowchart illustrated in FIG. 9. In step S1801, the tool A 3100 determines whether or not the "generation of settings permitted" check box 511 of the UI 501 illustrated in FIG. 5 has been checked. In other words, the tool A 3100 determines whether or not generation of the print settings for the driver printer 3500 is permitted. When it is determined that generation of print settings for the printer driver 3500 is not permitted, after passing through the connection point C, the process proceeds to step S920. On the other hand, when generation of printing settings for the printer driver 3500 is permitted, the process proceeds to step S1811.

In step S1811, the tool A 3100 displays the message box 1620 illustrated in FIG. 16 to inquire to a user about whether or not to generate printing settings for the printer driver 3500. In step S1812, the tool A 3100 determines whether or not a user has selected the "yes" button 1621 of the message box 1620. When it is determined that the "yes" button 1621 has not been selected, after passing through the connection point C, the process proceeds to step S920. When the "yes" button 1621 has been selected, the process proceeds to step S1820. In step S1820, the tool A 3100 displays the setting generation dialog box 1710 illustrated in FIG. 17A. Then in step S1831, the tool A 3100 receives the user operation performed on the printer driver 3500 and the setting generation dialog box 1710 via the UI 1726. In step S1832, the tool A 3100 determines whether or not the "save" button 1740 of the setting generation dialog box 1710 has been pressed by a user. When it is determined that the "save" button 1740 has not been pressed, the process returns to step S1831. On the other hand, when it is determined that the "save" button 1740 has been pressed by a user, the process proceeds to step S1841. In step S1841, the tool A 3100 uses the contents of the user operation performed on the UI 1726 for the printer driver and the setting generation dialog box 1710 to save the print setting for the printer driver 3500. Then in step S1842, the tool A 3100 selects the saved print settings as the print settings for the printer driver 3500 and the process returns to step S913 through the connection point B illustrated in FIG. 9. An example of processing of the tool A 3100 to generate print settings for the printer driver 3500 has been described above. However this processing is not always required.

Figure 19:
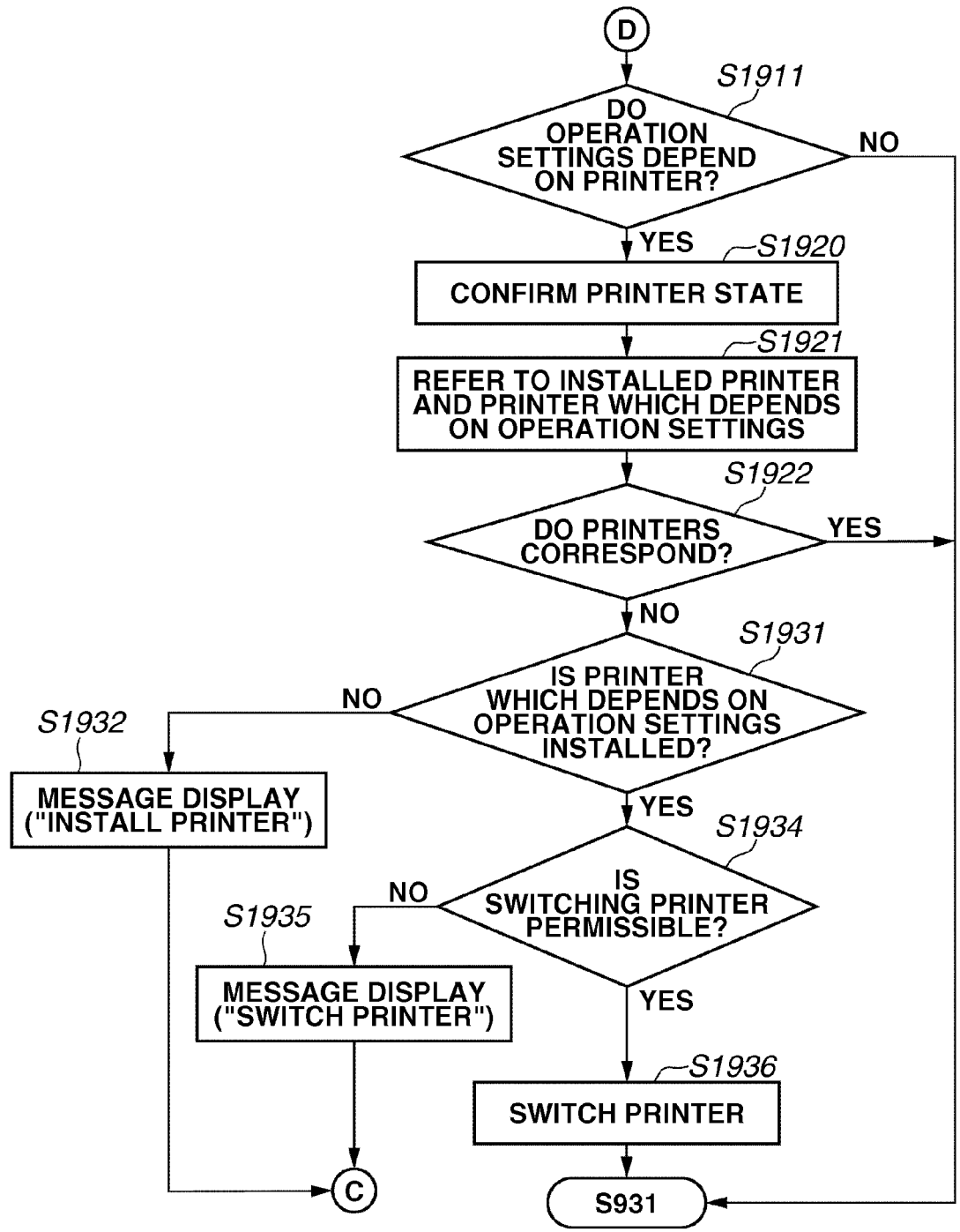
FIG. 19 is a flowchart illustrating an example of the operation of the tool A when executing processing by considering whether or not the operation settings contained in the input parameters are present in a printer.

In the printing system according to the present exemplary embodiment, when an operation setting contained in the input parameters (the print settings for the printer driver 3500) is present in the printer 1500, the printer 1500 is switched according to the object model of the print setting data. An example of the operation of the tool A 3100 when processing is executed taking into account whether or not operation settings contained in the input parameters are present in the printer 1500 will be described making reference to the flowchart in FIG. 19. The processing illustrated in this flowchart is executed after passing through the connection point D illustrated in FIG. 9. In step S1911, the tool A 3100 determines whether or not the operation settings contained in the input parameters are present in the printer 1500. When it is determined that the operation settings contained in the input parameters are not present in the printer 1500, the process proceeds to step S931 in FIG. 9. On the other hand, when it is determined that the operation settings contained in the input parameters are present in the printer 1500, the process proceeds to step S1920. In step S1920, the tool A 3100 confirms the state of the printer 1500. Then in step S1921, the tool A 3100 refers to the printer 1500 including the operation settings contained in the input parameter and the installed printer 1500.

Then in step S1922, the tool A 3100 determines whether or not the printer 1500 based on the operation settings contained in the input parameters is the same as the printer 1500 set for execution of printing. When it is determined that the printer 1500 based on the operation settings contained in the input parameters corresponds to the printer 1500 set for execution of printing, the process proceeds to step S931 in FIG. 9. On the other hand, when it is determined that the printer 1500 based on the operation settings contained in the input parameters does not correspond to the printer 1500 set for execution of printing, the process proceeds to step S1931. In step S1931, the tool A 3100 determines whether or not the printer 1500 based on the operation settings contained in the input parameters is installed. When it is determined that the printer 1500 based on the operation settings contained in the input parameters is not installed, the process proceeds to step S1932. On the other hand, when it is determined that the printer 1500 based on the operation settings contained in the input parameters is installed, the process proceeds to step S1934. In step S1932, the tool A 3100 displays a message containing information specifying the printer 1500 to be installed and information prompting the installation of the printer 1500. Then the process proceeds to step S920 in FIG. 9. However the process may proceed to step S960 instead of step S920.

In step S1934, the tool A 3100 determines whether or not the "switch printer" checkbox 513 of the UI 503 illustrated in FIG. 5 is checked. In other words, the tool A 3100 determines whether or not switching of the printer 1500 is permitted. When it is determined that switching of the printer 1500 is not permitted, the process proceeds to step S1935. When it is determined that switching of the printer 1500 is permitted, the process proceeds to step S1936. In step S1935, the tool A 3100 displays a message containing information specifying the printer 1500 to be switched and information prompting the switching of the printer 1500. On the other hand, in step S1936, the tool A 3100 switches the printer 1500 for execution of printing to the printer 1500 based on the operation settings contained in the input parameters. Then the process proceeds to step S931 in FIG. 9. An example of processing to switch a printer has been described above. However this processing is not always required.

FIG. 20 illustrates an example of the relationship between an operation mode and a print setting for the printer driver 3500. In FIG. 20, a package 2020 is an install package for the printer driver 3500 stored in the external memory 11. The factory default (0) 3600, the custom default (1) 3700 and the custom default (2) 3800 are print setting data (data files) stored in the external memory 11. These elements are loaded onto the RAM 2 by the module using the data or the OS. The printer driver 3500 includes original set values, in other words, the factory default (0) 3600. The factory default (0) 3600 is the settings made when shipped from the factory. Thereafter, the print settings for the printer driver 3500 are customized when installing the printer driver 3500 (when generating the package 2020) and the custom default (1) 3700 may be used as the print setting data. Furthermore the printer driver 3500 may be customized when executing the printer driver 3500 to make those print settings the custom default (2) 3800. The application and participation of the tool A 3100 in the customizing process of the printer driver 3500 when the printer driver 3500 is executed is one of the characteristic features of the printing system according to the present exemplary embodiment.

Treating the factory default (0) 3600, the custom default (1) 3700 and the custom default (2) 3800 as three levels is the modes of the printer driver 3500 described in FIG. 10. In standard mode 1031, the factory default (0) 3600 is the source of print settings. In static setting update mode 1032, the custom default (1) 3700 is applied as (a part of) the print settings for the printer driver 3500. In dynamic setting update mode 1033, the custom default (2) 3800 is applied as (a part of) the print settings for the printer driver 3500. As described above, the custom default (2) 3800 may be one setting or a plurality thereof.

Thus, in the present exemplary embodiment, the printer driver 3500 is operated in three types of modes. When viewed from operational characteristics such as customization of the print settings, the transition to each mode is considered as follows.
1. The standard mode 1031 is in an initial state.
2. The static setting update mode 1032 is customized from the standard mode 1031.
3. The dynamic setting update mode 1033 is customized from the standard mode 1031 or the static setting update mode 1032.

In the example described using FIG. 4 or FIG. 7, the source of print setting data before application of the custom default (2) 3800 by participation of the tool A 3100 is the custom default (1) 3700. However print setting data before application of the custom default (2) 3800 as indicated by (3) above is not the custom default (1) 3700 but rather may be the factory default (0) 3600. The printer driver 3500 executes management operations by dividing print setting according to the operation of the three modes arranged in temporal sequence. Operations have been divided according to mode but the data format of the print settings may take a common format for all modes. When a common data format is used, a unified generation method for print settings can be used. The relationship between operation mode and settings of the printer driver 3500 in the printing system according to the present exemplary embodiment has been described above.

Figure 21A:
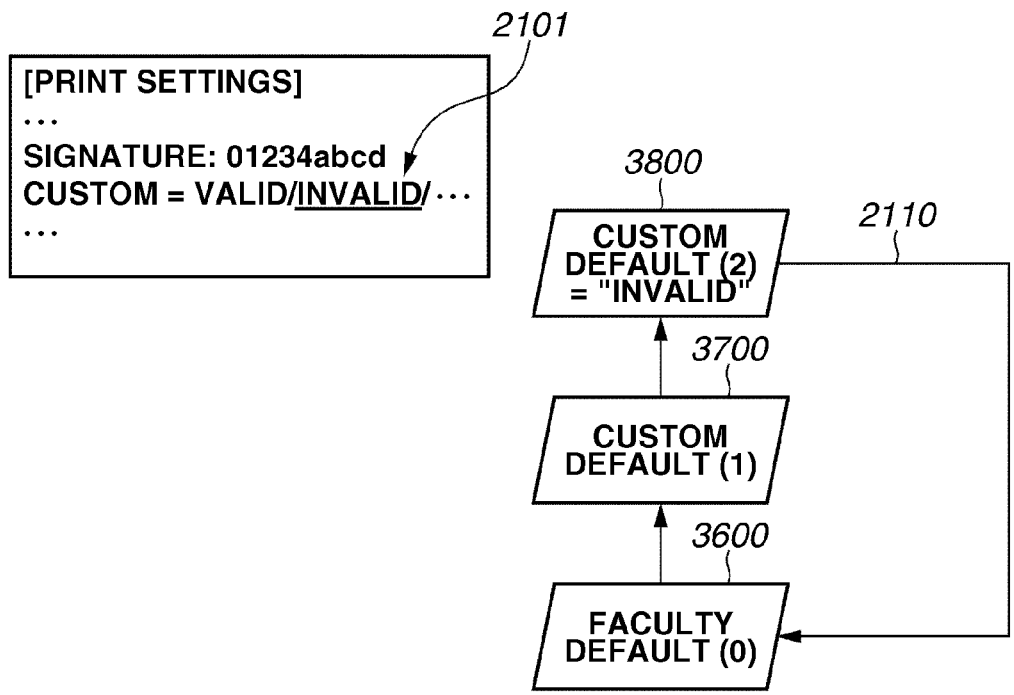
FIGS. 21A and 21B illustrate an example of operation when print settings for a printer driver are invalidated.
Figure 21B:
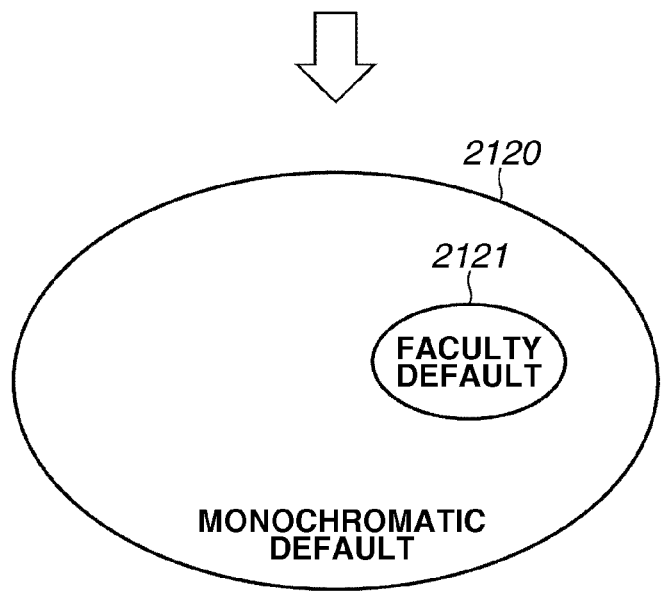

FIG. 21 illustrates an example of operation when a print setting for a printer driver 3500 is disabled. More specifically, FIG. 21A illustrates the transfer of print settings to the factory default (0) 3600 when the custom default (2) 3800 is disabled. FIG. 21B is a schematic diagram illustrating the operation illustrated in FIG. 21A. In the present exemplary embodiment, an invalidation 2101 can be designated on the custom default (2) 3800 used in dynamic setting update mode 1033. When the printer driver 3500 determines that an invalidation 2101 for the custom default (2) 3800 has been designated, an operation is executed to apply print setting data from the factory default (0) 3600 (refer to reference numeral 2110). The invalidation 2101 on the custom default (2) 3800 may be designated on the entire custom default (2) 3800 or individually. The printer driver 3500 uses dynamic setting update mode 1033 for operation but uses the factory default (0) 3600 for print settings.

As described above, the printer driver 3500, for example, uses the following timing to make a determination of whether or not the invalidation 2101 of the custom default (2) 3800 is designated. In other words, since the mode in step S1030 in FIG. 10 is determined to be dynamic setting update mode, the determination can be made until the acquisition of print setting data in step S1051. When an invalidation 2101 is not designated on the custom default (2) 3800, the printer driver 3500 acquires the custom default (2) 3800 in step S1051 as described above. When an invalidation 2101 is designated on the custom default (2) 3800, the printer driver 3500 acquires the factory default (0) 3600 in step S1051. Although an example has been described of transferring the print settings to the factory default (0) when the custom default (2) 3800 is invalid, it is not always required to execute this operation. For example, the print settings may be transferred to the custom default (1) 3700.

The effect of invalidation of the print settings will be described. Monochromatic printing is executed in static setting update mode 1032 such as the print setting 2120 illustrated in FIG. 21B. In contrast, a setting configured to disable the custom default (2) 3800 is executed in dynamic setting update mode. Consequently, in print setting 2121 for example, the factory default (0) 3600 is applied locally to the printer driver 3500. Thus switching to normal mode can be performed in a specific case without the user operation. By thus designating the invalidation, it is possible that a part of monochromatic printing operations is excluded. An operational example of invalidation of print settings in the printing system according to the present exemplary embodiment has been described above. However this processing is not always required. The control and management during application of print settings executing in accordance with the above description can be applied to processing in which print setting is recorded and distributed as information. The format or layout of structure may be varied such as embedding print settings in a tool, configuring the settings as a log, or transferring the print settings to another location.

When executing the print processing of the printer driver according to the present exemplary embodiment, if a program module related to variation of the print settings of the printer driver participates in the print processing, apart of the print settings of the printer driver is switched to the print setting according to the program module. Consequently print setting for the printer driver can be dynamically customized during execution of print processing of the printer driver without altering the application.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-082787 filed Mar. 30, 2009, which is hereby incorporated by reference herein in its entirety.

What is claimed is:

1. A method comprising:
   determining whether a program module for varying print settings for a printer driver is participating in print processing when the printer driver executes print processing;
   switching a part of the print settings for the printer driver to the print settings according to the program module when the program module is participating in the print processing; and
   setting an application object of the program module based on an operation, wherein it is determined that the program module is participating in the print processing when the printer driver is activated by a process according to the application object set in the setting.

2. The method according to claim 1 further comprising:
   linking the program module and the switched print settings in accordance with an operation, wherein
   in the switching, the part of the print settings is switched to print settings linked to the program module.

3. The method according to claim 1, wherein:
   in the switching, the part of the print settings is switched to print settings set as a switching object among a plurality of print settings processed by the program module when the program module is participating in the print processing.

4. The method according to claim 1, further comprising:
   determining whether or not the switched print settings are set; and
   generating print settings based on an operation when the switched print settings are not set, wherein in the switching, the part of print settings is switched to the generated print settings when the switched print settings are not set.

5. The method according to claim 1, further comprising:
   disabling the switching of the part of the print settings wherein in the switching, the part of print settings is switched to print settings which are different from the print settings processed by the program module, when switching of the part of the print settings is disabled.

6. The method according to claim 1, wherein it is determined that the program module for varying the print settings is participating in the print processing when a predetermined process ID is confirmed.

7. The method according to claim 1, further comprising:
   when a predetermined application is activated by the program module, switching print settings for print processing by the predetermined application to print settings according to the program module; and
   not switching print settings for print processing for applications other than the application.

8. An apparatus comprising:
   a determination unit configured to determine whether a program module for varying print settings for a printer driver is participating in print processing when the printer driver executes print processing;
   a switching unit configured to switch a part of the print settings for the printer driver to print settings according to the program module when the program module is participating in the print processing; and
   a setting unit configured to set an application object of the program module based on an operation, wherein it is determined that the program module is participating in the print processing when the printer driver is activated by a process according to the application object set in the setting unit.

9. The apparatus according to claim 8 further comprising:
   a linking unit configured to link the program module and the switched print settings in accordance with an operation, wherein
   in the switching, the part of the switched print settings is linked to the program module.

10. The apparatus according to claim 8, wherein the part of the print settings is switched to print settings set as a switching object among a plurality of print settings processed by the program module when the program module is participating in the print processing.

11. The apparatus according to claim 8, further comprising:
    a generating unit configured to generate print settings based on an operation when the switched print settings are not set, wherein
    the part of print settings is switched to the generated print settings when the switched print settings are not set.

12. The apparatus according to claim 8, further comprising:
    a disabling unit configured to disable the switching of the part of the print settings wherein the part of print settings is switched to print settings which are different from the print settings processed by the program module, when switching of the part of the print settings is disabled.

13. A non-transitory computer-readable storage medium storing a computer program for causing a computer to execute each step of the print control method according to claim 1.

14. The computer-readable storage medium according to claim 13 further comprising:
    linking the program module and the switched print settings in accordance with an operation, wherein in the switching, the part of the print settings is switched to print settings linked to the program module.

15. The computer-readable storage medium according to claim 13 further comprising:
setting an application object of the program module based on an operation, wherein it is determined that the program module is participating in the print processing when the printer driver is activated by a process according to an application object set in the setting.

16. The computer-readable storage medium according to claim 13, wherein:
in the switching, the part of the print settings is switched to print settings set as a switching object among a plurality of print settings processed by the program module when the program module is participating in the print processing.

17. The computer-readable storage medium according to claim 13, further comprising:
determining whether or not the switched print settings are set; and
generating print settings based on an operation when the switched print settings are not set, wherein
in the switching, the part of print settings is switched to the generated print settings when the switched print settings are not set.

18. The computer-readable storage medium according to claim 13, further comprising:
disabling the switching of the part of the print settings wherein in the switching, the part of print settings is switched to print settings which are different from the print settings processed by the program module, when switching of the part of the print settings is disabled.

\* \* \* \* \*